(12) United States Patent
Takuwa et al.

(10) Patent No.: US 8,605,576 B2
(45) Date of Patent: Dec. 10, 2013

(54) COMMUNICATION NETWORK SYSTEM, DATA TRANSMISSION METHOD, AND NODE APPARATUS

(75) Inventors: Kenya Takuwa, Kawasaki (JP); Eiji Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 13/118,584

(22) Filed: May 31, 2011

(65) Prior Publication Data

US 2011/0292791 A1 Dec. 1, 2011

(30) Foreign Application Priority Data

May 31, 2010 (JP) .................................. 2010-124576

(51) Int. Cl.
| | | |
|---|---|---|
| G01R 31/08 | (2006.01) | |
| G06F 11/00 | (2006.01) | |
| G06F 15/16 | (2006.01) | |
| H04L 1/00 | (2006.01) | |
| H04L 12/28 | (2006.01) | |
| G08B 25/00 | (2006.01) | |

(52) U.S. Cl.
USPC ........... 370/228; 370/244; 370/248; 370/400; 340/2.9; 340/6.1; 709/239; 714/2

(58) Field of Classification Search
USPC ............ 370/228, 217, 242, 221; 340/2.9, 6.1; 709/239; 714/2
See application file for complete search history.

(56) References Cited

U.S. PATENT DOCUMENTS

| | | | |
|---|---|---|---|
| 7,151,775 B1* | 12/2006 | Renwick et al. | 370/400 |
| 7,835,271 B2* | 11/2010 | Alicherry et al. | 370/221 |
| 8,064,331 B2* | 11/2011 | Tanaka et al. | 370/216 |
| 2006/0013127 A1 | 1/2006 | Izaiku et al. | |
| 2010/0128611 A1* | 5/2010 | Deguchi | 370/242 |
| 2011/0019534 A1* | 1/2011 | Ramakrishnan et al. | 370/217 |

FOREIGN PATENT DOCUMENTS

| | | |
|---|---|---|
| JP | 2003-60680 A | 2/2003 |
| JP | 2006-33307 A | 2/2006 |

* cited by examiner

*Primary Examiner* — Alpus H Hsu
*Assistant Examiner* — Anthony Luo
(74) *Attorney, Agent, or Firm* — Fujitsu Patent Center

(57) ABSTRACT

A communication network system includes a processor, and a plurality of node apparatuses using a protocol to establish paths therebetween, wherein the processor determines each of the node apparatuses to be a packet source or a packet destination, and operates to detect an occurrence of failure in two paths being established between the packet source and the packet destination in the communication network system, and wherein the processor transmits packet data including user data through one of the two paths, and when one of the node apparatuses detects an occurrence of a failure in one of the two paths, the processor changes the path to the other path.

3 Claims, 26 Drawing Sheets

| PACKET INPUT LINE PACKAGE NAME-LINE NUMBER (LINE# n) [290-3-1] | DB INSTANCE NO. [290-3-2] | OUTPUT PATH PACKAGE NAME-LINE NUMBER (Line)-PATH NUMBER (ch) [290-3-3] |
|---|---|---|
| E11-1 | 0<br>1<br>2<br>3<br>... | E15-1-1<br>E15-1-3<br>E18-4-2<br>E19-2-1 |
| E11-2 | m+1<br>...<br>m*2 | E16-1-4 |
| ... | | |
| E110-10 | x | |

COMMUNICATION NETWORK SYSTEM, DATA TRANSMISSION METHOD, AND NODE APPARATUS

CROSS-REFERENCE TO RELATED APPLICATIONS

This application is based upon and claims the benefit of priority of the prior Japanese Patent Application No. 2010-124576, filed on May 31, 2010, the entire contents of which are incorporated herein by reference.

FIELD

The present invention relates to a communication network system, a data transmission method, and a node apparatus.

BACKGROUND

Hitherto, the multi protocol label switching (MPLS) system has been available as a method of transferring packet data. The MPLS system is the technology of communications with high speed by assigning an identifier, which is referred to as a label, to packet data.

Additionally, the multi protocol label switching—transport profile (MPLS-TP) system of the MPLS system has been available in recent years, where the MPLS system provides an improved operation administration and maintenance (OAM) functions.

The unidirectional path switched ring (UPSR) system, which is used in a network of the synchronous digital hierarchy (SDH) transfer system, has been available as the system having OAM functions in a communication network. In the UPSR system, a network includes a plurality of node apparatuses arranged to form a ring, and a node apparatus functioning as a data source transmits the same data in two directions of the ring, that is, through an active line and a standby line under normal conditions. Further, in the UPSR system, a node apparatus functioning as the data destination receives the data from the active line under normal conditions. When a failure occurs in the active line, the destination node apparatus changes the active line to the standby line to receive the data.

However, increasing of the utilization efficiency of the lines in an MPLS network has not been considered in the related technologies.

To increase the efficiency of the MPLS network, the source node apparatus may transmit the same data to paths extending in both directions, that is, the active and the standby lines, and the destination node apparatus may change the active line to a different line if needed, as is the case with the UPSR system.

SUMMARY

According to an aspect of the disclosed embodiments, a communication network system includes a processor, and a plurality of node apparatuses using a protocol to establish paths therebetween, wherein the processor determines each of the node apparatuses to be a packet source or a packet destination, and operates to detect an occurrence of failure in two paths being established between the packet source and the packet destination in the communication network system, and wherein the processor transmits packet data including user data through one of the two paths, and when one of the node apparatuses detects an occurrence of a failure in one of the two paths, the processor changes the path to the other path.

The object and advantages of the disclosed embodiments will be realized and attained by at least the features, elements and combinations particularly pointed out in the claims.

It is to be understood that both the foregoing general description and the following detailed description are exemplary and explanatory and are not restrictive of the disclosed embodiments, as claimed.

BRIEF DESCRIPTION OF DRAWINGS

FIG. 7 is a table of a line/path database.

DESCRIPTION OF EMBODIMENTS

Hereinafter, embodiments of a communication network system, a data transmission method, and a node apparatus, which are disclosed in this application, will be described in detail with reference to the attached drawings. However, disclosed technologies are not limited to those of the above-described embodiments.

When the amount of data flowing through a path provided as the standby line is so increased that the standby line is congested with the data, other data to be used for another service may be abandoned due to the classification function of the MPLS-TP system. Consequently, the above-described configuration may not improve the utilization efficiency of the lines in the MPLS network.

Figure 1:
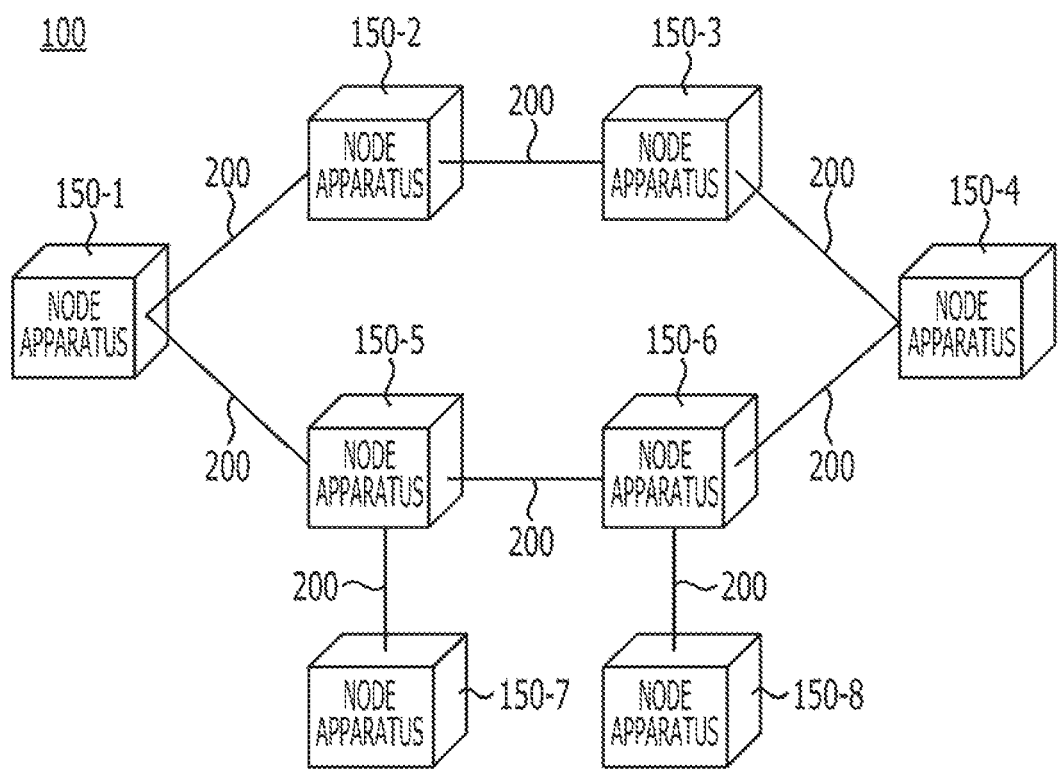
FIG. 1 illustrates a configuration of a communication network system according to an embodiment.

FIG. 1 illustrates an exemplary configuration of a communication network system 100 according to an embodiment. The communication network system 100 includes a plurality of node apparatuses, such as 150-1 to 150-8 configured to transmit and receive MPLS labeled data. Without being limited to an apparatus configured to transmit and receive the MPLS labeled data, the node apparatuses 150-1 to 150-8 may be apparatuses using a protocol to establish paths between a source node apparatus and a destination node apparatus. The node apparatuses 150-1 to 150-6 are connected to form a ring with bidirectional lines. The node apparatuses 150-5 and 150-7 are connected to each other via a line 200. The node apparatuses 150-6 and 150-8 are connected to each other via another line 200. The node apparatus 150-1 functions as a source node and the node apparatus 150-4 functions as a destination node. Data exchanged between the node apparatuses 150-1 to 150-8 may be packet data including user data. Two paths are established between the node apparatuses 150-1 and 150-4; one of the paths connects the node apparatuses 150-2 and 150-3, and the other path connects the node apparatuses 150-5 and 150-6. The node apparatuses 150-2, 150-3, 150-5, and 150-6 are intermediate node apparatuses configured to form the two paths. The node apparatuses 150-7 and 150-8 transmit and receive data via the node apparatuses 150-5 and 150-8, respectively.

Figure 2:
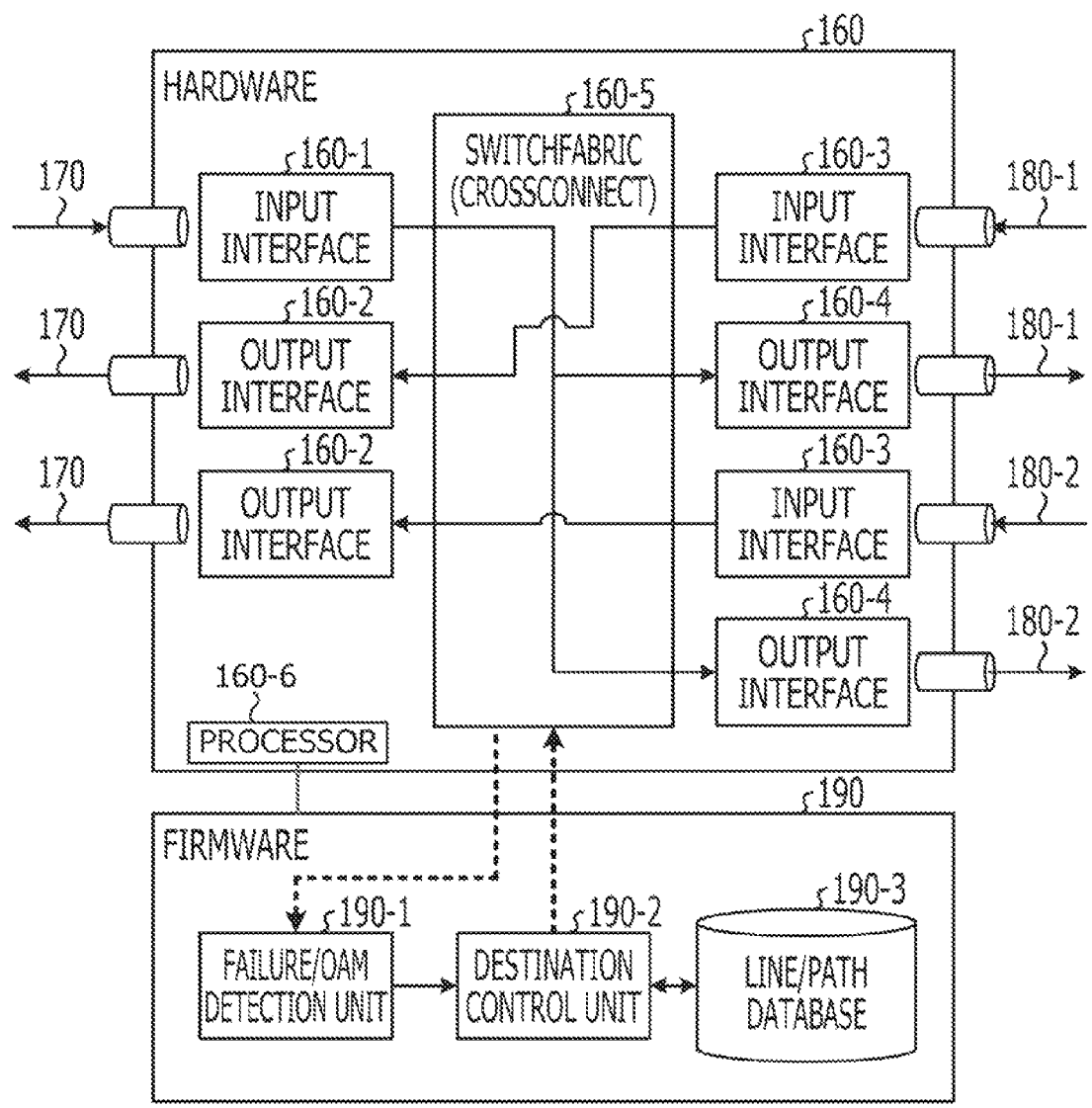
FIG. 2 illustrates a functional block diagram of an end node apparatus.
Figure 3:
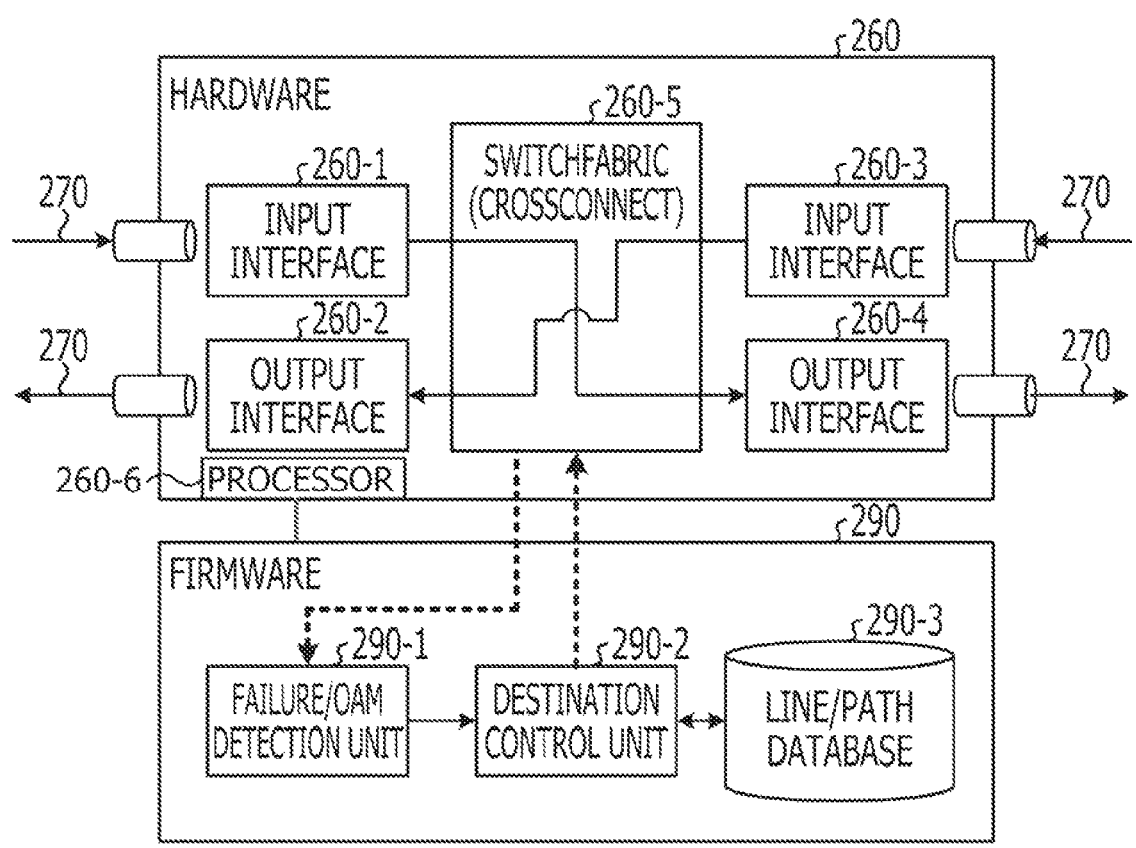
FIG. 3 illustrates a functional block diagram of an intermediate node apparatus.

Exemplary configurations of the node apparatuses will be described with reference to FIGS. 2 and 3. FIG. 2 illustrates a functional block diagram of an end node apparatus, and FIG. 3 illustrates a functional block diagram of an intermediate node apparatus. As illustrated in FIG. 2, a hardware 160 of the end node apparatus includes an input interface 160-1 configured to input an SDH signal and the like from an adjacent apparatus via an optical fiber 170. The hardware 160 further includes an output interface 160-2 configured to output an SDH signal and the like to an adjacent apparatus via an optical fiber 170. The hardware 160 further includes an input interface 160-3 configured to input a packet signal (hereinafter "packet signal" includes similar kind of signals) from an adjacent node apparatus via a LAN cable 180-1 or 180-2. The hardware 160 further includes an output interface 160-4 configured to output a packet signal to an adjacent node apparatus via the LAN cable 180-1 or 180-2. The input interface 160-3 receives, for example, remote defect indication (RDI) which is an alarm signal, path-RDI (P-RDI) packet data indicating an alarm issued to each path, and a signal which is a notification of the OAM occurrence that are transmitted from the adjacent node apparatus. The hardware 160 of the end node apparatus includes a switch fabric 160-5 configured to select the output interface 160-2 or 160-4 upon receiving a signal input from the input interface 160-1 or 160-3.

Further, a firmware 190 of the end node apparatus includes a failure/OAM detection unit 190-1, a destination control unit 190-2, and a line/path database 190-3. The failure/OAM detection unit 190-1 detects the failure/OAM condition of the line 200 based on the RDI data and the P-RDI data transmitted to the input interface 160-3, and the presence or absence of the OAM occurrence. The failure/OAM detection unit 190-1 detects and transmits information on the failure/OAM condition of the line 200 to the destination control unit 190-2. The line/path database 190-3 includes information on the paths having respective lines 200. The destination unit 190-2 indicates the data destination based on the information on the failure/OAM condition of the line 200, the information being transmitted from the failure/OAM detection unit 190-1, and the line/path database 190-3. The details of each of the failure/OAM detection unit 190-1, the destination control unit 190-2, and the line/path database 190-3 will be described later. A processor 160-6 runs a failure/OAM detection unit 190-1, a destination 190-2, and a line/path database 190-3.

On the other hand, a hardware 260 of the intermediate node apparatus includes; an input interface 260-1 configured to input a packet signal transmitted from an adjacent node apparatus via a LAN cable 270 as illustrated in FIG. 3; an output interface 260-2 configured to output a packet signal to an adjacent node apparatus via the LAN cable 270; an input interface 260-3 configured to input a packet signal transmitted from an adjacent node apparatus via the LAN cable 270; an output interface 260-4 configured to output a packet signal to an adjacent node apparatus via the LAN cable 270; and a switch fabric 260-5 configured to switch the connections between a connection of the input interface 260-1 and the output interface 260-4 and a connection of the input interface 260-3 and the output interface 260-2.

Further, a firmware 290 of the intermediate node apparatus includes a failure/OAM detection unit 290-1, a destination control unit 290-2, and a line/path database 290-3. The failure/OAM detection unit 290-1 detects the failure/OAM condition of the line 200 based on RDI data, P-RDI data, and the presence or absence of the OAM occurrence, and transmits information on the failure/OAM condition to the destination control unit 290-2. The line/path database 290-3 has information on the paths composing respective lines 200. The destination control unit 290-2 controls the data destination, the data is transmitted from the failure/OAM detection unit 290-1, on the basis of the information on the failure/OAM condition of the line 200 and the line/path database 290-3. The details of the failure/OAM detection unit 290-1, the destination control unit 290-2, and the line/path database 290-3 will be described later. A processor 260-6 runs a failure/OAM detection unit 290-1, a destination 290-2, and a line/path database 290-3.

Figure 4:
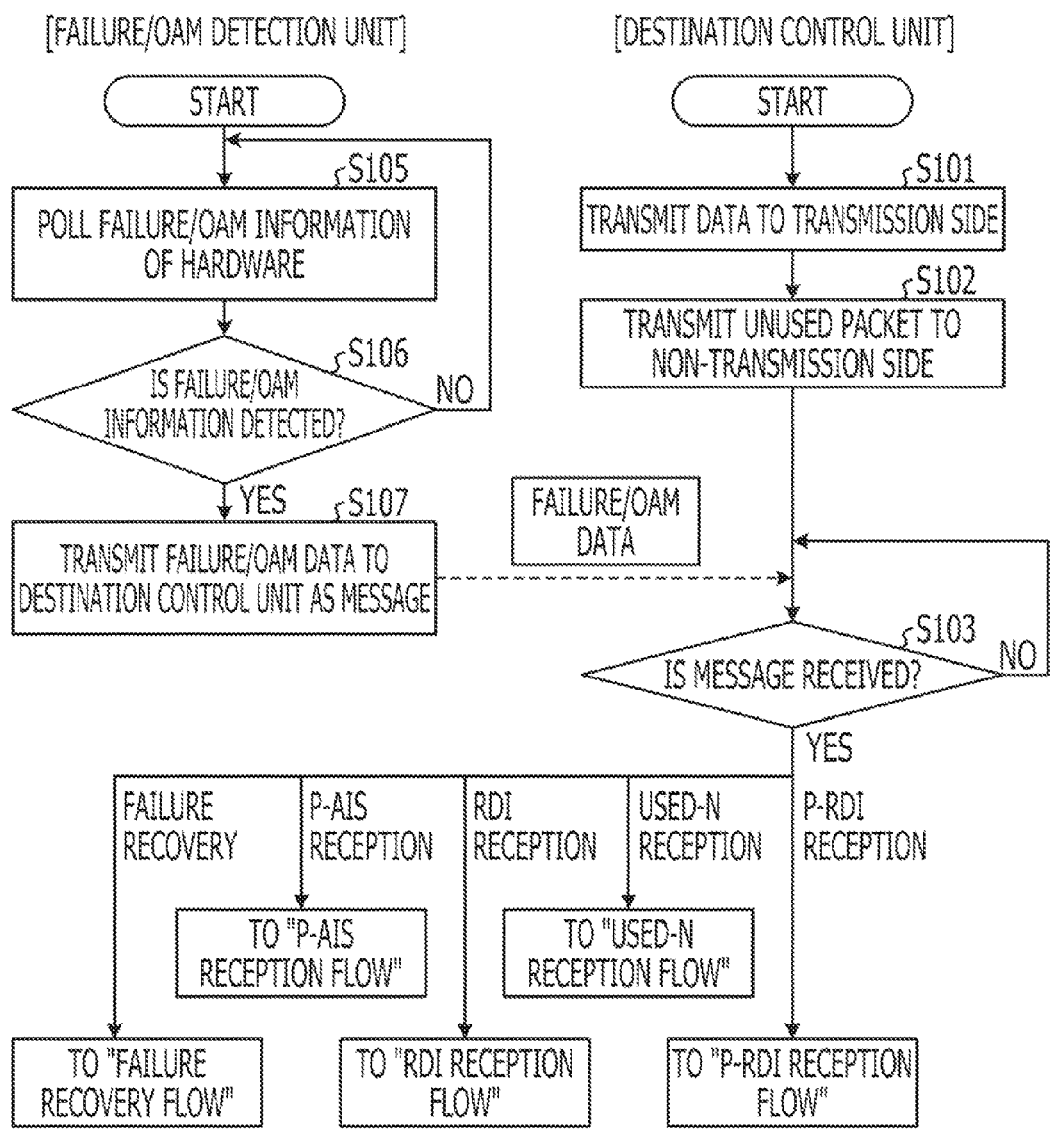
FIG. 4 is a flowchart of a process performed by a failure/OAM detection unit and a destination control unit of the end node apparatus.

Next, the flow of exemplary process performed by the end node apparatus will be described. FIG. 4 is a flowchart of a process performed by the failure/OAM detection unit 190-1 and the destination control unit 190-2 of the end node apparatus. After starting the process, the destination control unit 190-2 transmits data to a path provided on the transmission side (operation S101). Then, the destination control unit 190-2 transmits a UNUSED packet data indicating that no data is transmitted to a path provided on the non-transmission side (operation S102). The destination control unit 190-2 transmits data to the transmission-side path and confirms whether or not message data is transmitted from the failure/OAM detection unit 190-1 to the destination control unit 190-2 while transmitting the UNUSED packet data to the non-transmission-side path (operation S103). The destination control unit 190-2 waits until the message data is transmitted from the failure/OAM detection unit 190-1 to the destination control unit 190-2 (No: operation S103). The process from an operation S101 to S103 will be described with reference to FIG. 5.

Figure 5:
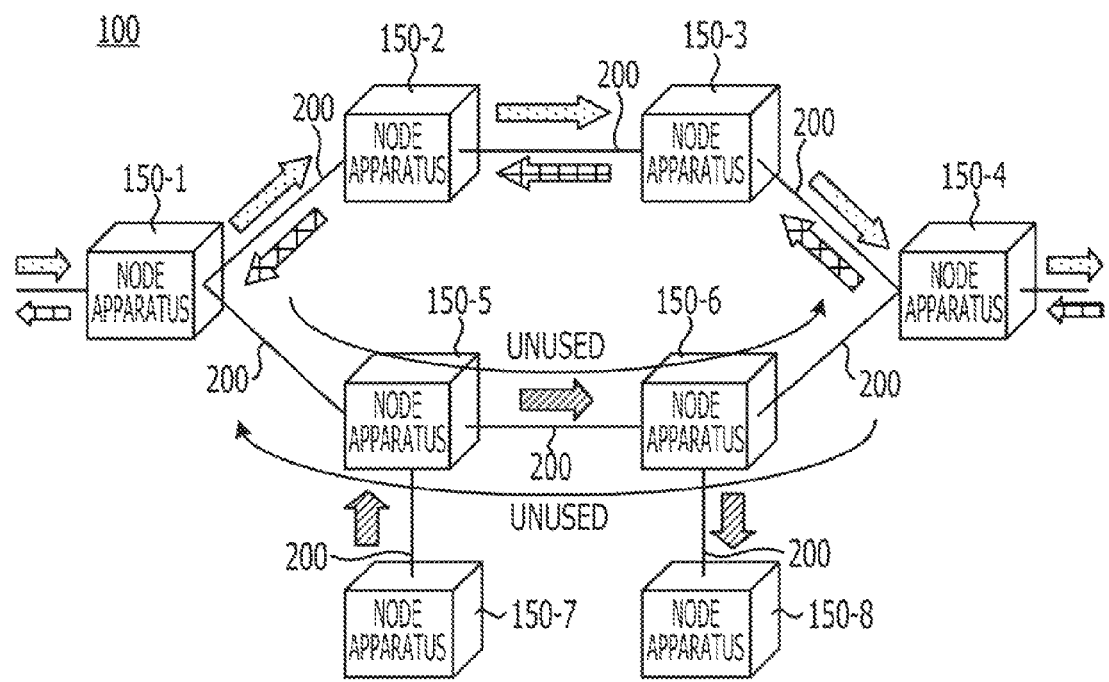
FIG. 5 illustrates a configuration of a communication network system working under normal conditions.

FIG. 5 illustrates a configuration of the communication network system working under normal conditions. When transmitting data to the node apparatus 150-4, the node apparatus 150-1 transmits data through the path extending via the node apparatuses 150-2 and 150-3. Further, the node apparatus 150-1 transmits the UNUSED packet data through the path extending the node apparatuses 150-5 and 150-6. When transmitting data to the node apparatus 150-1, the node apparatus 150-4 transmits data through the path extending via the node apparatuses 150-3 and 150-2. Further, the node apparatus 150-4 transmits the UNUSED packet data through the path extending via the node apparatuses 150-6 and 150-5. Here, the node apparatus 150-4 selects either data transmitted from the node apparatus 150-3 or that from the node apparatus 150-6. Since no data is transmitted from the node apparatus 150-6 in the example illustrated in FIG. 5, the node apparatus 150-4 receives the data transmitted from the node apparatus 150-3. The node apparatus 150-1 selects either data transmitted from the node apparatus 150-2 or that from the node apparatus 150-5. Since no data is transmitted from the node apparatus 150-5 in the example illustrated in FIG. 5, the node apparatus 150-1 receives the data transmitted from the node apparatus 150-2.

Thus, of the two paths in the network, each of the end node apparatuses 150-1 and 150-4 transmits data only through the path extending via the node apparatuses 150-2 and 150-3, but not through the path extending via the node apparatuses 150-5 and 150-6. Accordingly, the node apparatus 150-7 may transmit data to be used in a difference service to the node apparatus 150-8 through the path extending via the node apparatuses 150-5 and 150-6. As a consequence, the communication network system 100 of the present embodiment may increase the utilization efficiency of the lines 200 of the MPLS network.

Returning to FIG. 4, the failure/OAM detection unit 190-1 polls information on the failure/OAM of hardware after starting processing (operation S105). Then, the failure/OAM detection unit 190-1 confirms whether or not the failure/OAM information is detected (operation S106). When no failure/OAM information is detected (NO: operation S106), the failure/OAM detection unit 190-1 returns to operation S105. When the failure/OAM information is detected (YES: operation S106), the failure/OAM detection unit 190-1 transmits the failure/OAM information to the destination control unit 190-2 (operation S107).

Upon receiving message data from the failure/OAM detection unit 190-1 (YES: operation S103), the destination control unit 190-2 performs processing based on the type of the message data. There are five types of message data items. The five types are the P-RDI, USED-N, RDI, path alarm indicating signal (P-AIS), and failure recovery types. The details of processing performed by the destination control unit 190-2 for each message data item will be described later.

Figure 6:
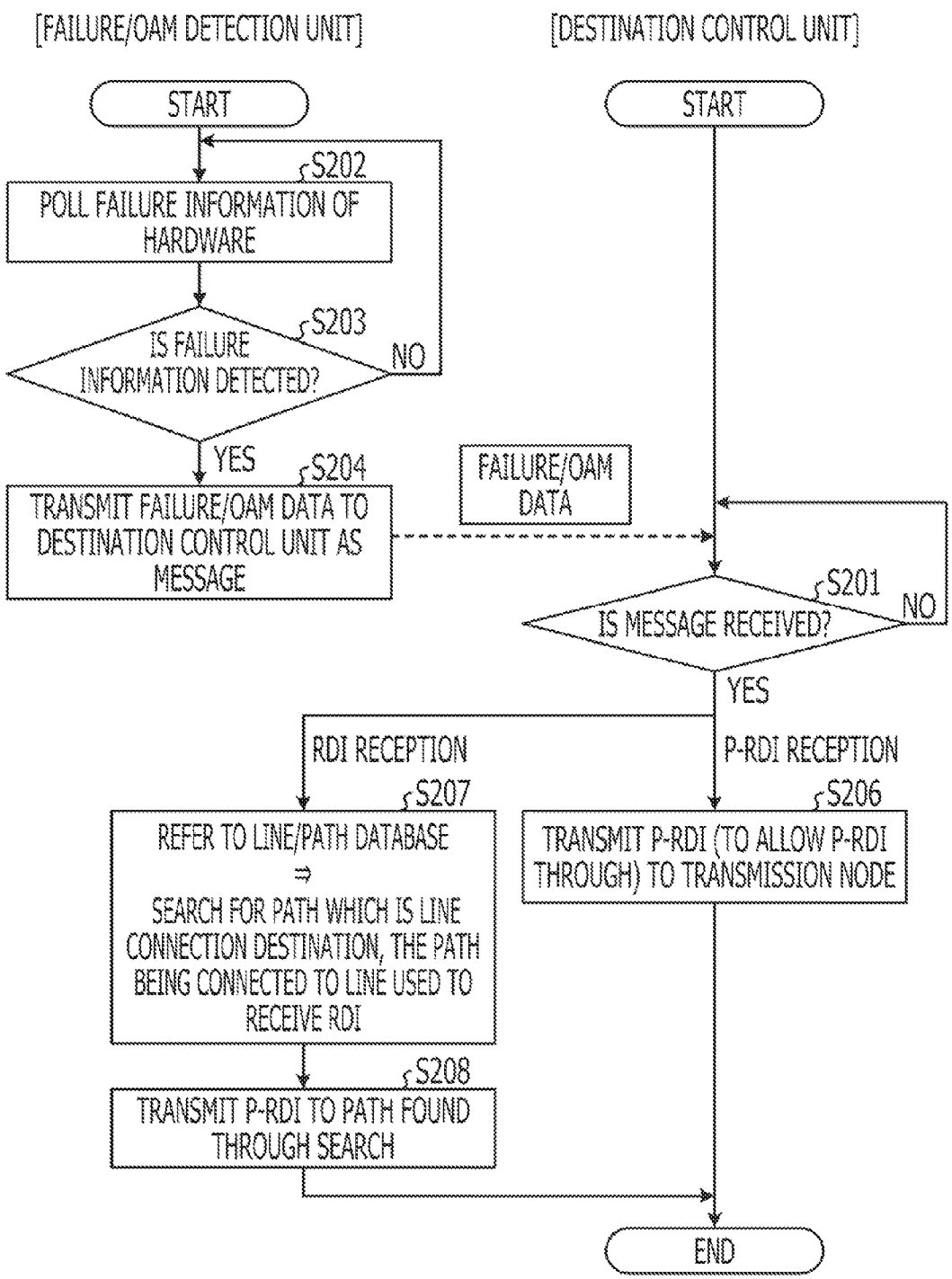
FIG. 6 is a flowchart of a process performed by a failure/OAM detection unit and a destination control unit of the intermediate node apparatus.

Next, the flow of exemplary process performed by the intermediate node apparatus will be described. FIG. 6 is a flowchart of a process performed by the failure/OAM detection unit 290-1 and the destination control unit 290-2 of the intermediate node apparatus. After starting the process, the destination control unit 290-2 confirms whether or not message data is transmitted from the failure/OAM detection unit 290-1 to the destination control unit 290-2 (operation S201).

The destination control unit 290-2 waits until the message data is transmitted from the failure/OAM detection unit 290-1 to the destination control unit 290-2 (No: operation S201). The failure/OAM detection unit 290-1 polls information on the failure/OAM of the hardware after starting the process (operation S202). Then, the failure/OAM detection unit 290-1 confirms whether or not the failure/OAM information is detected (operation S203). If no failure/OAM information is detected (NO: operation S203), the failure/OAM detection unit 290-1 returns to operation S202. When the failure/OAM information is detected (YES: operation S203), the failure/OAM detection unit 290-1 transmits the failure/OAM information to the destination control unit 290-2 (operation S204).

Upon receiving the message data transmitted from the failure/OAM detection unit 290-1 (YES: operation S201), where the message data is of the P-RDI type, the destination control unit 290-2 transmits P-RDI data to an adjacent node apparatus provided on the upstream side with reference to the data transmission direction (operation S206). That is, when the message data is of the P-RDI type, the destination control unit 290-2 transfers the P-RDI data to the adjacent node apparatus provided on the upstream side. On the other hand, when the message data is of the RDI type, the destination control unit 290-2 searches for a path connected to the line 200 that had been used to receive the RDI message data by referring to the line/path database 290-3 (operation S207). The destination control unit 290-2 transmits P-RDI data to the path determined through the search operation (operation S208). Hereinafter, an example of the line/path database 290-3 and the process from the operation S207 and S208 will be described with reference to FIGS. 7 and 8.

FIG. 7 is a table of a line/path database 290-3, which includes packet input line package name-line number (LINE#n) data 290-3-1, database (DB) instance No. data 290-3-2, and output path package name-line number (Line)-path number (ch) data 290-3-3. Upon receiving RDI data, the intermediate node apparatus refers to the line/path database 290-3, which is table for determination of the destination of P-RDI data. Upon receiving the RDI data transmitted through a line E11-1, for example, the intermediate node apparatus inserts the P-RDI data into OAM packet data and transmits the OAM packet data through paths including E15-1-1, E15-1-3, E18-4-2, E19-2-1, and the like by referring to the line/path database 290-3. In the line/path database 290-3 illustrated in FIG. 7, the sign m indicates the maximum number of paths that are included in a single line, and the sign x indicates (the maximum package number×the maximum line number× the maximum path number)−1.

Figure 8:
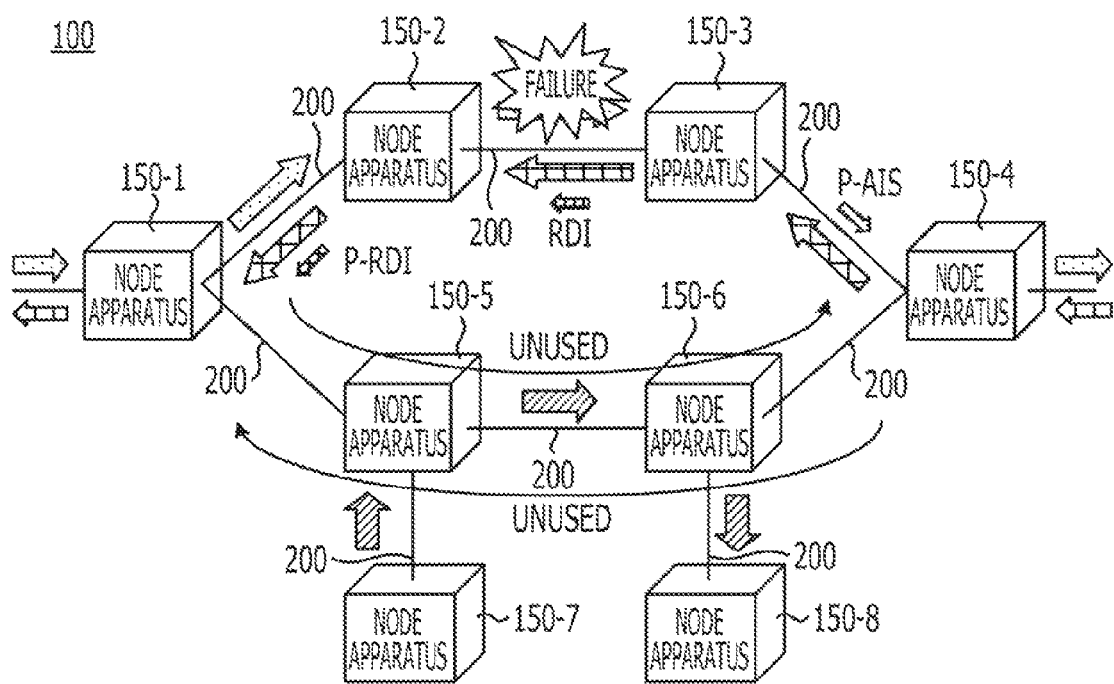
FIG. 8 illustrates a configuration of a communication network system working under failure conditions.

FIG. 8 illustrates a configuration of a communication network system working under failure conditions. FIG. 8 illustrates an example where a failure occurs in a line provided to transmit data from the node apparatus 150-2 to the node apparatus 150-3, that is, a line provided on the data transmission side. Upon detecting the line failure, the node apparatus 150-3 inserts RDI data into OAM packet data, transmits the OAM packet data to the node apparatus 150-2, and transmits P-AIS packet data indicating an alarm issued to each path, to the node apparatus 150-4. Upon receiving the RDI data transmitted from the node apparatus 150-3, the node apparatus 150-2 inserts P-RDI data into OAM packet data and transmits the OAM packet data to the node apparatus 150-1 based on the operations S207 and S208. Here, continuity check message (CCM) data is exchanged between node apparatuses including the node apparatuses 150-2 and 150-3 at regular intervals. When it is difficult to receive the CCM data at determined intervals of time which is not less than, for example, 3.5 times the transmission interval, the line failure is detected.

Figure 9:
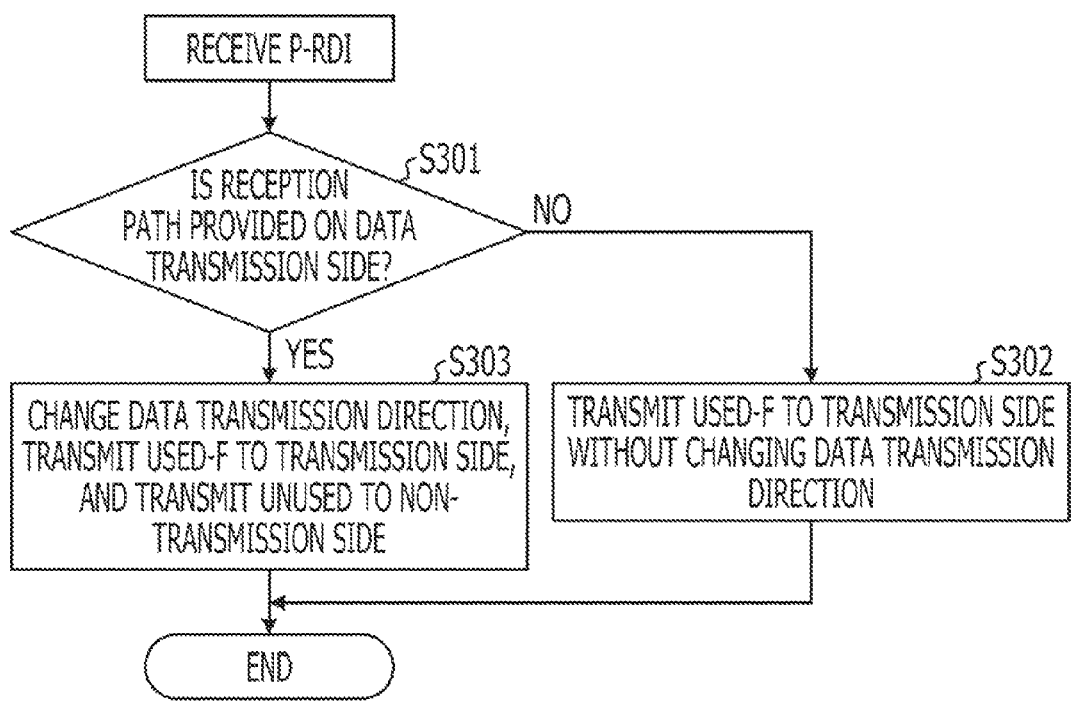
FIG. 9 is a flowchart of a process performed by the destination control unit of the end node apparatus upon receiving P-RDI (path-remote defect indication) data.

Next, an exemplary process will be described. This process is performed when the P-RDI data is transmitted to the destination control unit 190-2 of the end node apparatus. FIG. 9 is a flowchart of a process performed by the destination control unit 190-2 when the P-RDI data is transmitted to the destination control unit 190-2. Upon receiving the P-RDI data, the destination control unit 190-2 confirms whether or not a path used to receive the P-RDI data is a path provided on the data transmission side (operation S301). When the path used to receive the P-RDI data is a path provided on the data non-transmission side (NO: operation S301), which indicates that a failure occurs in a standby line, the destination control unit 190-2 transmits a USED-F data to the data transmission-side path without changing the data destination (operation S302). On the other hand, when the path used to receive the P-RDI data is the data transmission-side path (YES: operation S301), the destination control unit 190-2 changes the data transmission direction and transmits the USED-F data through the data transmission-side path specified based on the changed data transmission direction (operation S303). In addition, the destination control unit 190-2 transmits an UNUSED data through a path provided on the data non-transmission side (operation S303). Hereinafter, processing performed at operation S303 will be described with reference to FIG. 10.

Figure 10:
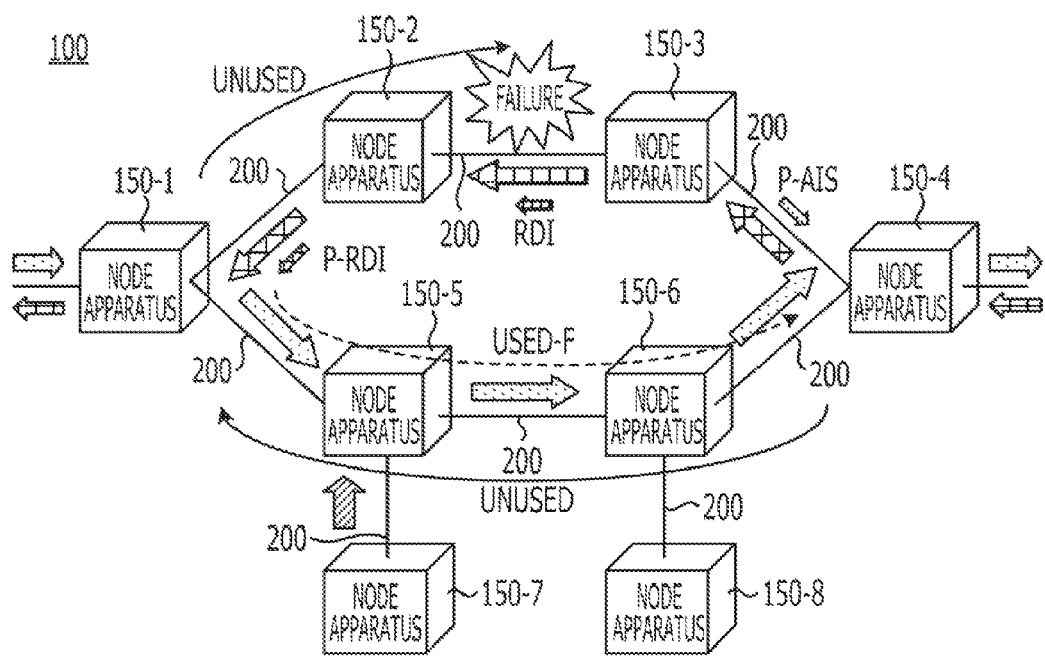
FIG. 10 illustrates a configuration of a communication network system working under failure conditions.

FIG. 10 illustrates another configuration of a communication network system working under failure conditions. The destination control unit 190-2 changes the data transmission path to the path extending via the node apparatuses 150-5 and 150-6 based on operation S303. Further, the destination control unit 190-2 transmits an USED-F data through the path extending via the node apparatuses 150-5 and 150-6 and an UNUSED data through the path extending via the node apparatuses 150-2 and 150-3. When the destination control unit 190-2 transmits data through the path extending via the node apparatuses 150-5 and 150-6, data transmitted from the node apparatus 150-7 to the node apparatus 150-5 is abandoned by the node apparatus 150-5 based on its classification function.

Figure 11:
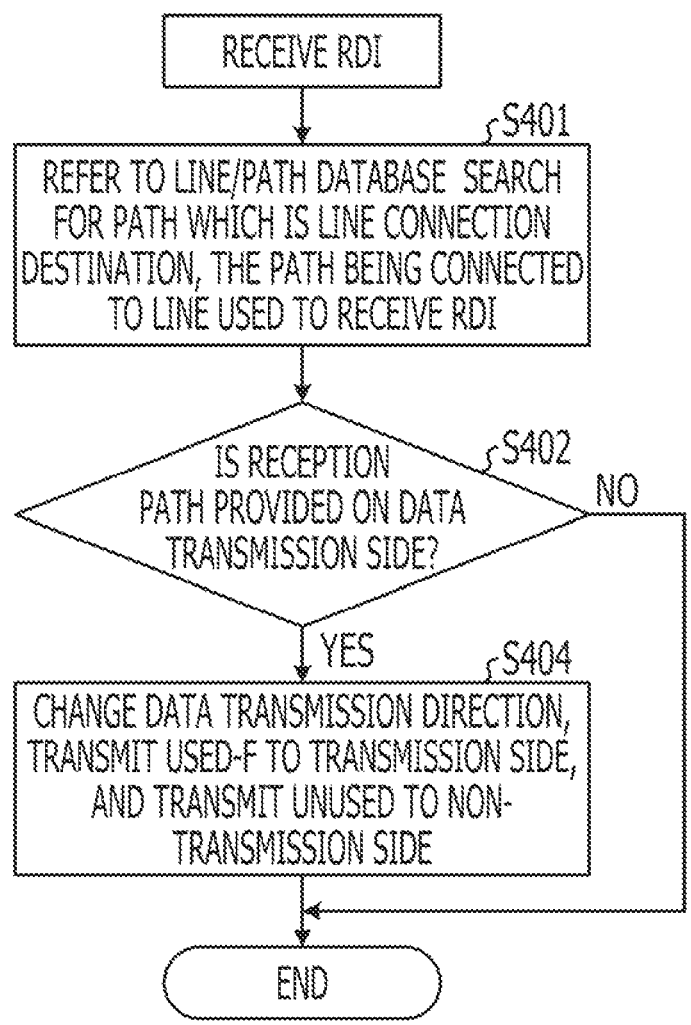
FIG. 11 is a flowchart of a process performed by the destination control unit of the end node apparatus upon receiving RDI data.

Next, exemplary processing procedures that are performed with the destination control unit 190-2 of the end node apparatus in response to the P-RDI reception will be described. For example, when a failure occurs in the line 200 used to transmit data from the node apparatus 150-1 to the node apparatus 150-2, the node apparatus 150-1 receives RDI data transmitted from the node apparatus 150-2. FIG. 11 is a flowchart of a process performed by the destination control unit 190-2 in response to the RDI reception. Upon receiving the RDI data, the destination control unit 190-2 searches for a path connected to the line 200 used to receive the RDI data by referring to the line/path database 190-3 (operation S401). The destination control unit 190-2 confirms whether or not the path found through the search is the data transmission-side path (operation S402). When the path found through the search is a path provided on the data non-transmission side (NO: operation S402), which indicates that a failure occurs in the standby line, the destination control unit 190-2 performs nothing. On the other hand, when the path found through the search is a path provided on the data transmission side (YES: operation S402), the destination control unit 190-2 changes the data transmission direction and transmits USED-F data through the data transmission-side path specified based on the changed data transmission direction (operation S404). In addition, the destination control unit 190-2 transmits UNUSED data through a path provided on the data non-transmission side (operation S404).

Figure 12:
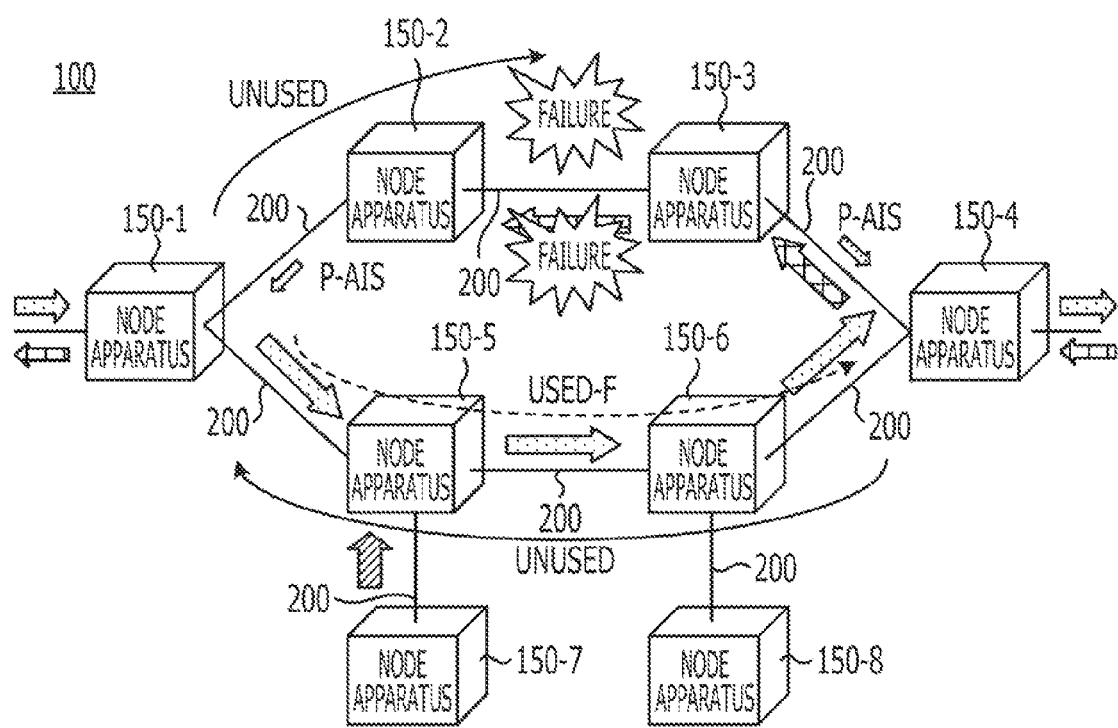
FIG. 12 illustrates a configuration of a communication network system working under failure conditions.

Next, an example where a failure occurs in a line through which data is transmitted from the node apparatus 150-3 to the node apparatus 150-2 in the state illustrated in FIG. 10 will be described. FIG. 12 illustrates a configuration of a communication network system working under failure conditions. Upon detecting a failure occurring in the line 200, the node apparatus 150-2 inserts RDI data into OAM packet data and transmits the OAM packet data to the node apparatus 150-3, and inserts P-AIS data into OAM packet data and transmits the OAM packet data to the node apparatus 150-1. In the example illustrated in FIG. 12, a failure occurs in the line 200 used to transmit data from the node apparatus 150-2 to the node apparatus 150-3. Therefore, the RDI data transmitted from the node apparatus 150-2 is not transmitted to the node apparatus 150-3.

Figure 13:
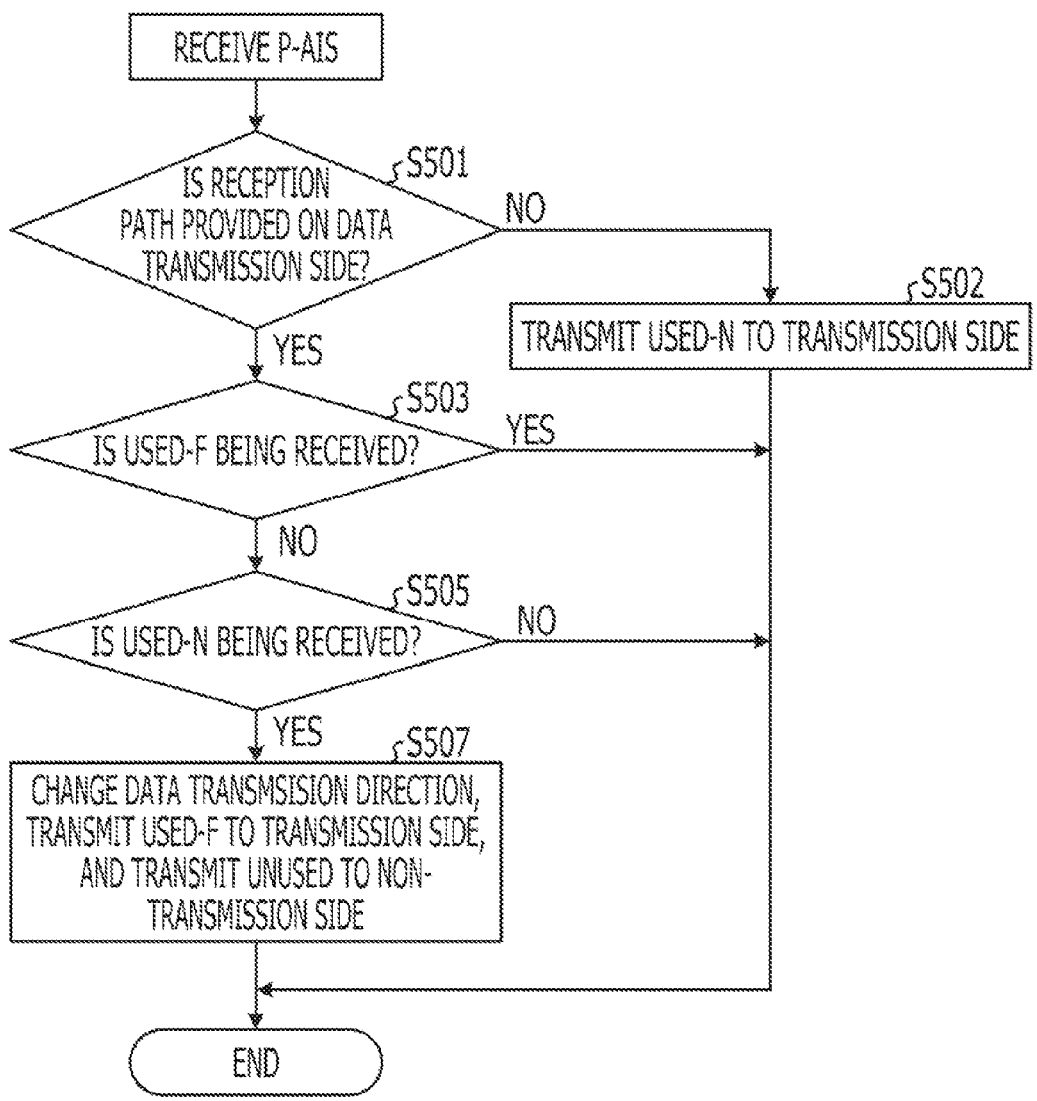
FIG. 13 is a flowchart of a process performed by the destination control unit of the end node apparatus upon receiving P-AIS (path alarm indicating signal) data.
Figure 14:
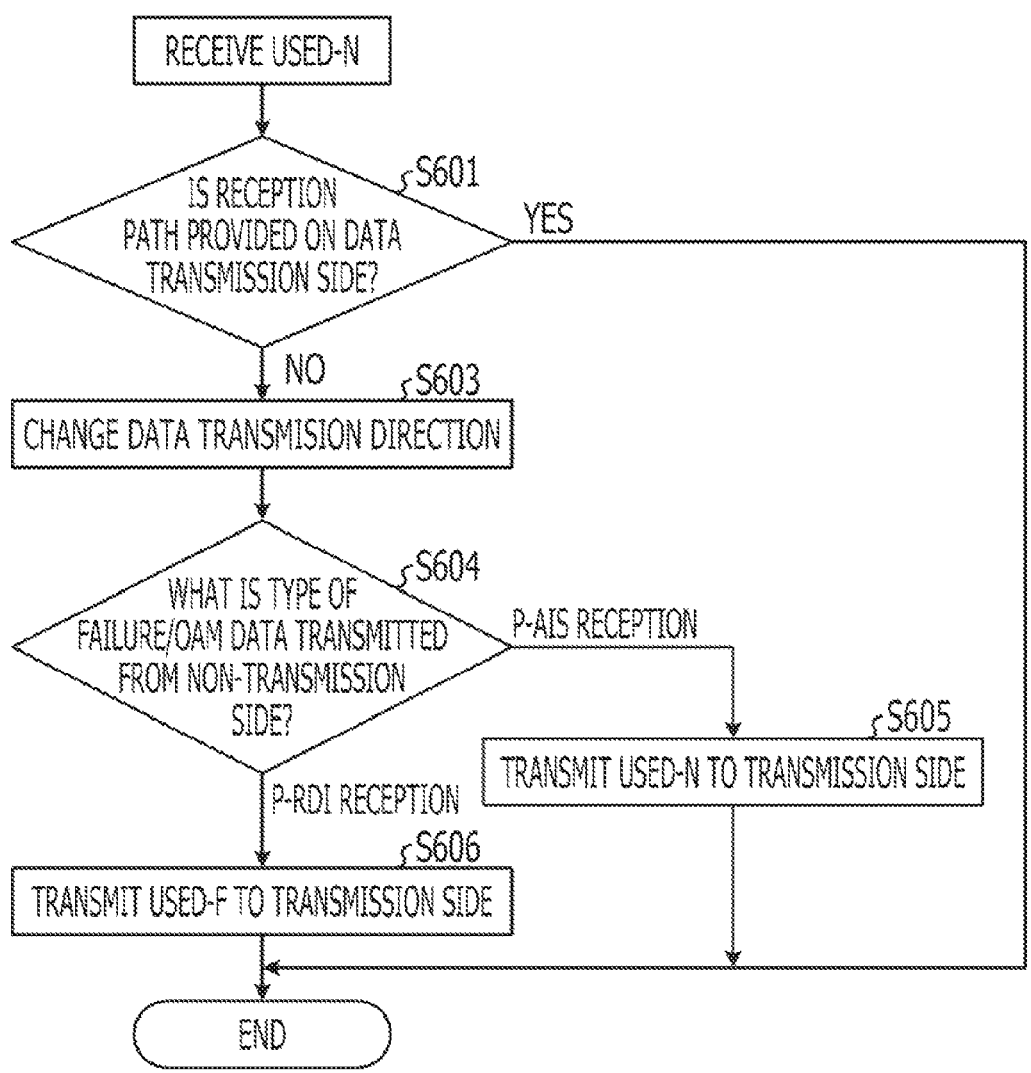
FIG. 14 is a flowchart of a process performed by the destination control unit of the end node apparatus upon receiving USED-N data.

Next, processing procedures that are performed with the destination control unit 190-2 of the end node apparatus in response to the reception of P-AIS data and USED-N data will be described. FIG. 13 illustrates the flow of processing procedures that are performed by the destination control unit 190-2 in response to the reception of the P-AIS data. FIG. 14 illustrates the flow of processing procedures that are performed by the destination control unit 190-2 in response to the reception of the USED-N data. Upon receiving the P-AIS data, the destination control unit 190-2 confirms whether or not a path used to receive the P-AIS data is a path provided on the data transmission side (operation S501). When the path used to receive the P-AIS data is the data non-transmission-side path (NO: operation S501), the destination control unit 190-2 transmits the USED-N data through the data transmission-side path (operation S502).

On the other hand, when the path used to receive the P-AIS data is the data transmission-side path (YES: operation S501), the destination control unit 190-2 confirms whether or not USED-F data is being transmitted to its own node apparatus (operation S503). When the USED-F data is being transmitted to its own node apparatus (YES: operation S503), which indicates that a failure occurs in the standby line, the destination control unit 190-2 performs nothing.

When the USED-F data is not being transmitted to its own node apparatus (NO: operation S503), the destination control unit 190-2 confirms whether or not the USED-N data is being transmitted to its own node apparatus (operation S505). When the USED-N data is not being transmitted to its own node apparatus (NO: operation S505), which indicates that a failure occurs in the standby line, the destination control unit 190-2 performs nothing. On the other hand, when the USED-N data is being transmitted to its own node apparatus (YES: operation S505), the destination control unit 190-2 changes the data transmission direction and transmits the USED-F data through a path specified based on the changed data transmission direction (operation S507). In addition, the destination control unit 190-2 transmits UNUSED data through the data non-transmission-side path (operation S507).

Upon receiving the USED-N data, the destination control unit 190-2 confirms whether or not the path used to receive the USED-N data is a path provided on the data transmission side (operation S601). When the path used to receive the USED-N data is the data transmission-side path (YES: operation S601), which indicates that a failure occurs in the standby line, the destination control unit 190-2 performs nothing.

On the other hand, when the path used to receive the USED-N data is the data non-transmission-side path (NO: operation S601), the destination control unit 190-2 changes the data transmission direction (operation S603). Then, the destination control unit 190-2 confirms the type of the failure/OAM data transmitted through the data non-transmission-side path (operation S604). When the failure/OAM data transmitted through the data non-transmission-side path is P-AIS data, the destination control unit 190-2 transmits USED-N data through the data transmission-side path (operation S605). When the failure/OAM data transmitted to the destination control unit 190-2 through the data non-transmission-side path is P-RDI data, the destination control unit 190-2 transmits USED-F data through the data transmission-side path (operation S606). Hereinafter, the processing procedures that are performed at operations S502, S603, and S605 will be described with reference to FIGS. 15 and 16.

Figure 15:
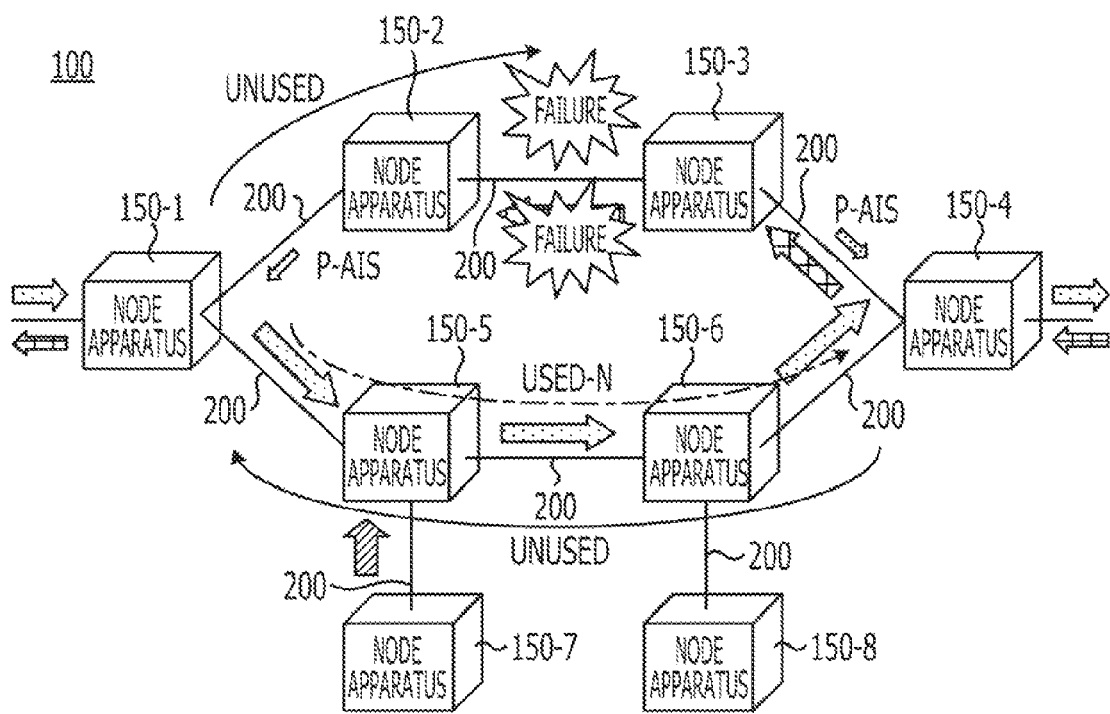
FIG. 15 illustrates a configuration of a communication network system working under failure conditions.
Figure 16:
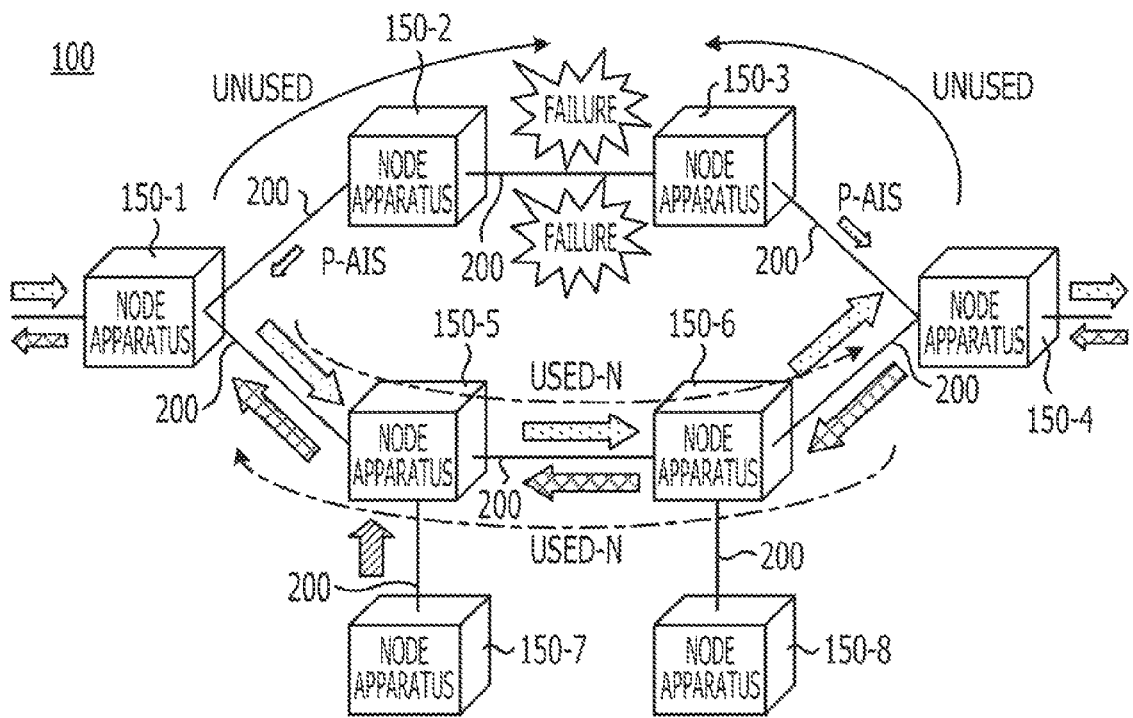
FIG. 16 illustrates a configuration of a communication network system working under failure conditions.

Each of FIGS. 15 and 16 illustrates a configuration of a communication network system working under failure conditions. Upon receiving P-AIS data transmitted through the data non-transmission-side path, the node apparatus 150-1 transmits USED-N data through a path provided on the data transmission side based on operation S502 as illustrated in FIG. 15. Further, upon receiving USED-N data transmitted through the data non-transmission-side path, the node apparatus 150-4 changes the data transmission path based on operation S603 as illustrated in FIG. 16. Further, since the node apparatus 150-4 receives the P-AIS data transmitted from the data non-transmission side, the node apparatus 150-4 transmits the USED-N data through the data transmission-side path based on operation S605 as illustrated in FIG. 16.

Figure 17:
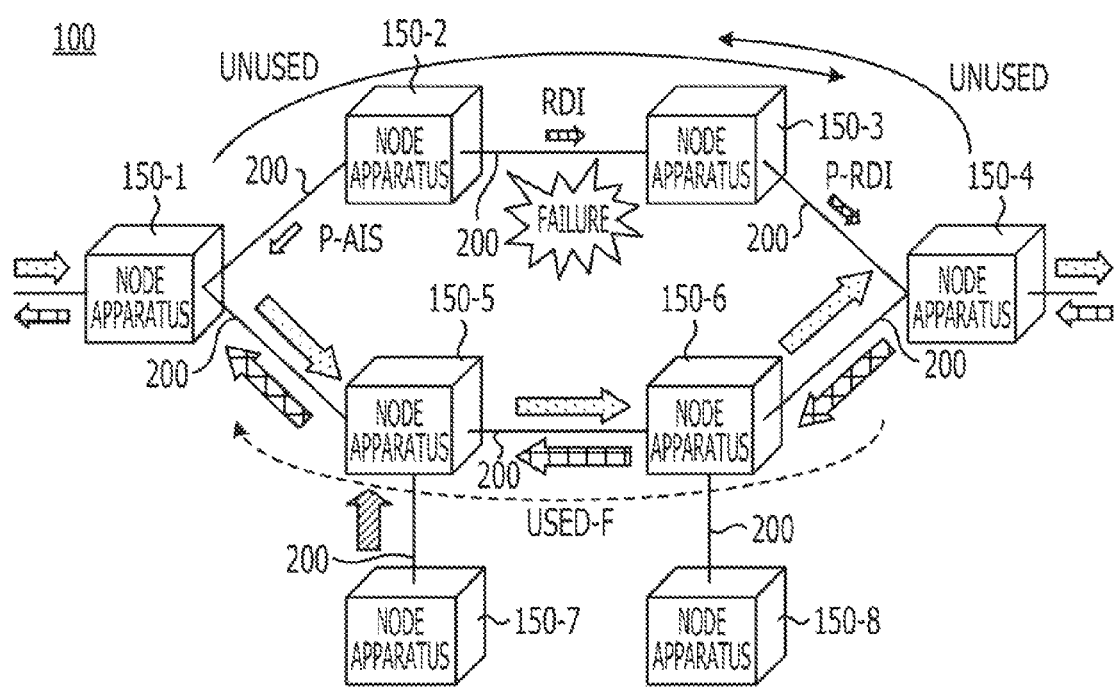
FIG. 17 illustrates a configuration of a recovered communication network system.

Next, processing procedures that are performed when information on the failure recovery is transmitted to the destination control unit 190-2 of the end node apparatus will be described. FIG. 17 illustrates a configuration of a recovered communication network system. The failure occurs in a line provided between the intermediate node apparatuses of the communication network system. When a recovery from a failure is made, the failure occurring in the line 200 used to transmit data from the node apparatus 150-2 to the node apparatus 150-3, the node apparatus 150-3 receives RDI data transmitted from the node apparatus 150-2 as illustrated in FIG. 17. The node apparatus 150-3 inserts P-RDI data into OAM packet data and transmits the OAM packet data to the node apparatus 150-4 based on operation S208, which is mentioned above. The node apparatus 150-4 transmits USED-F data through the data transmission-side path based on operation S302, which is mentioned above.

Figure 18:
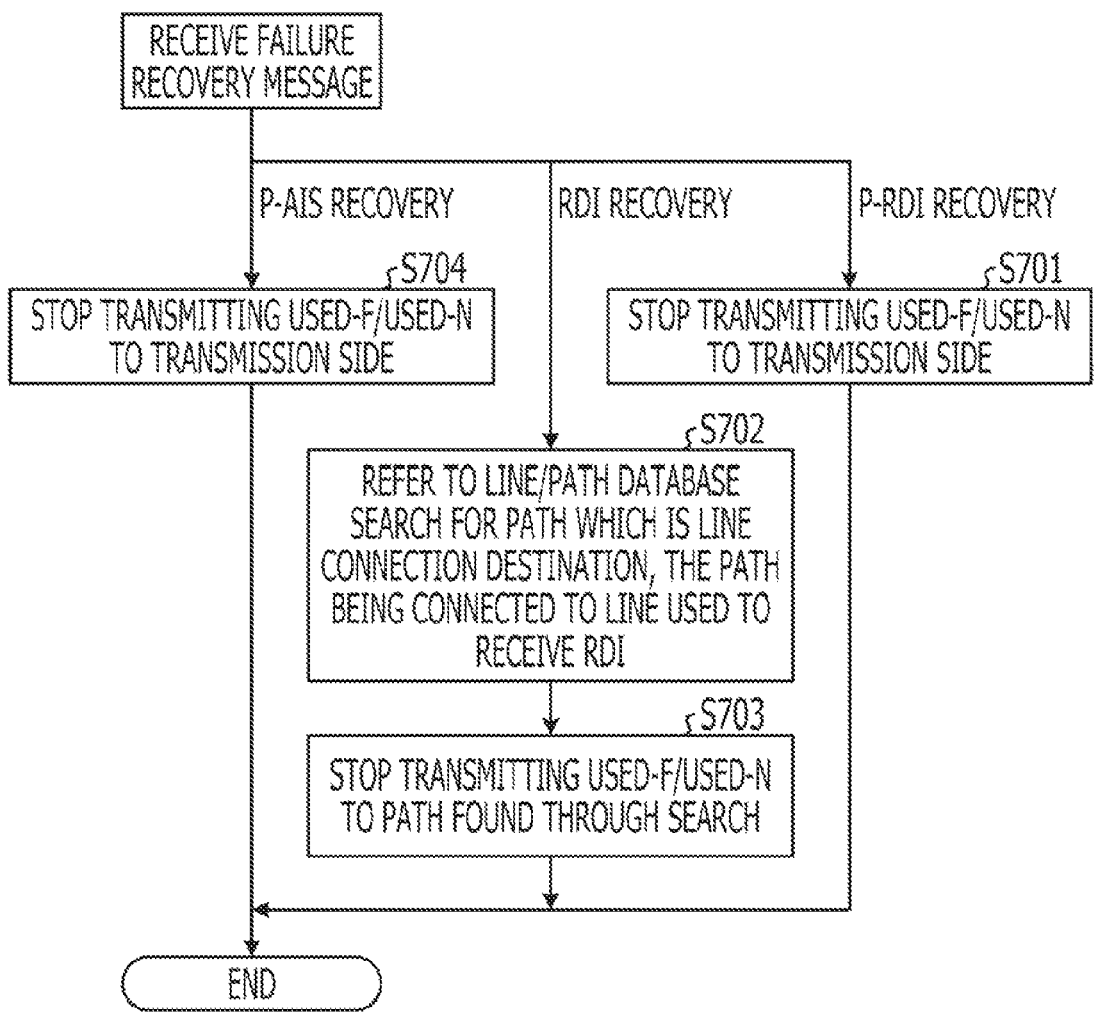
FIG. 18 is a flowchart of a process performed by the destination control unit of the end node apparatus upon receiving failure recovery-message data.

FIG. 18 illustrates the flow of exemplary processing procedures that are performed by the destination control unit 190-2 of the end node apparatus in response to the reception of failure recovery-message data. When the reception of the failure-recovery message data is the message of a failure recovery achieved due to the discontinuation of the P-RDI reception, the destination control unit 190-2 stops transmitting USED-F data or USED-N data through the data transmission-side path (operation S701). When the reception of the failure recovery-message data is the message of a failure recovery achieved due to the discontinuation of the RDI reception, the destination control unit 190-2 searches for the path connected to a line used to receive RDI data by referring to the line/path database 190-3 (operation S702). The destination control unit 190-2 stops transmitting the USED-F data or the USED-N data through the path found through the search (operation S703). Further, when the reception of the failure-recovery message data is the message of a failure recovery achieved due to the discontinuation of the P-AIS reception, the destination control unit 190-2 stops transmitting the USED-F data or the USED-N data through the data transmission-side path (operation S704). Hereinafter, processing performed at operation S701 will be described with reference to FIG. 19.

Figure 19:
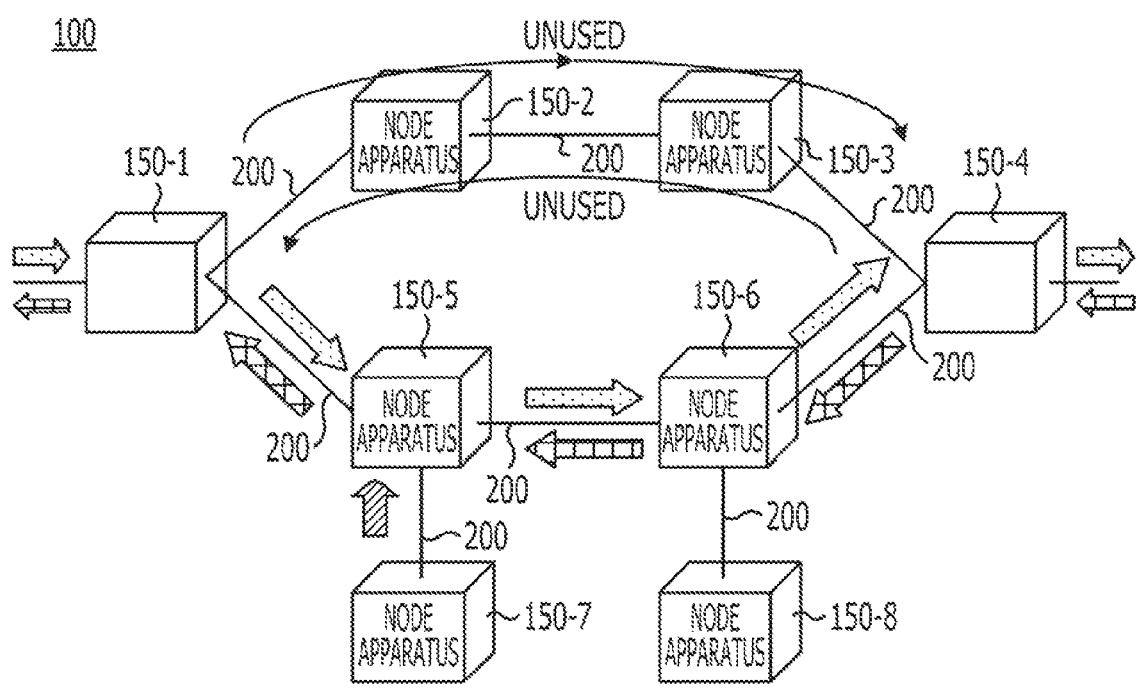
FIG. 19 illustrates a configuration of a recovered communication network system.

FIG. 19 illustrates a configuration of a recovered communication network system. Since a recovery from a failure is made, the failure occurring in the line 200 used to transmit data from the node apparatus 150-3 to the node apparatus 150-2, the node apparatus 150-2 stops transmitting P-AIS data to the node apparatus 150-1 and transmitting RDI data to the node apparatus 150-3. Since no RDI data is transmitted from the node apparatus 150-2 to the node apparatus 150-3, the node apparatus 150-3 stops transmitting P-RDI data to the node apparatus 150-4. Since no P-RDI data is transmitted from the node apparatus 150-3 to the node apparatus 150-4, the node apparatus 150-4 stops transmitting USED-F data through the data transmission-side path based on operation S701.

Figure 20:
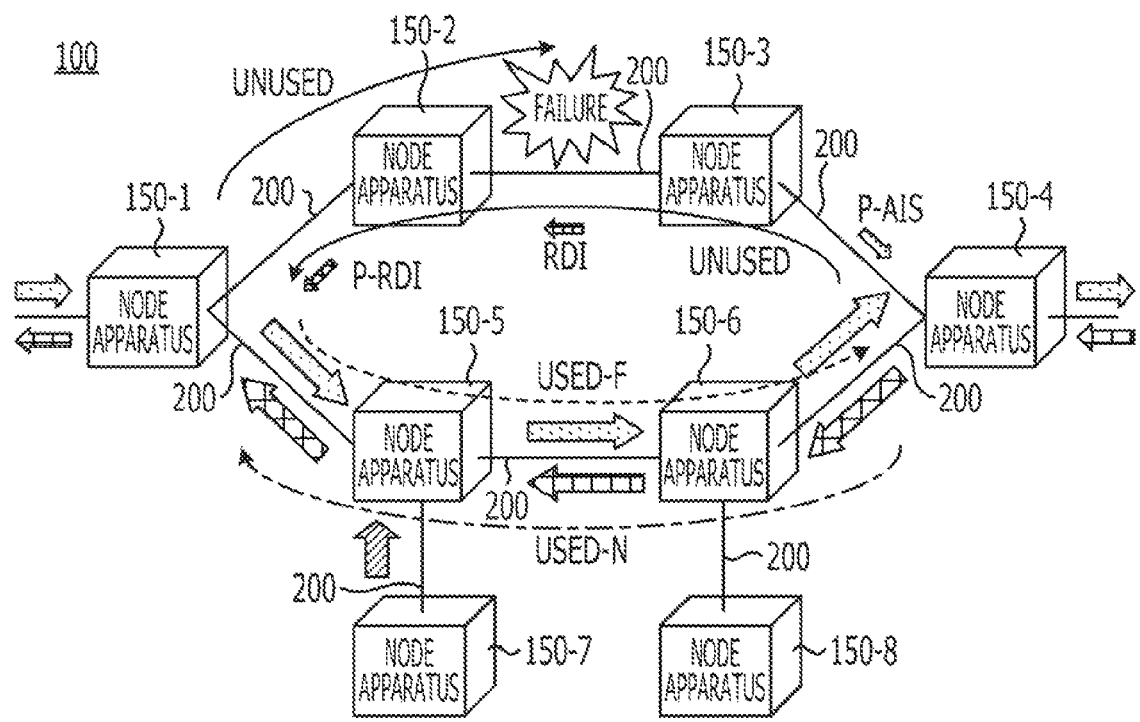
FIG. 20 illustrates a configuration of a communication network system working under failure conditions.
Figure 21:
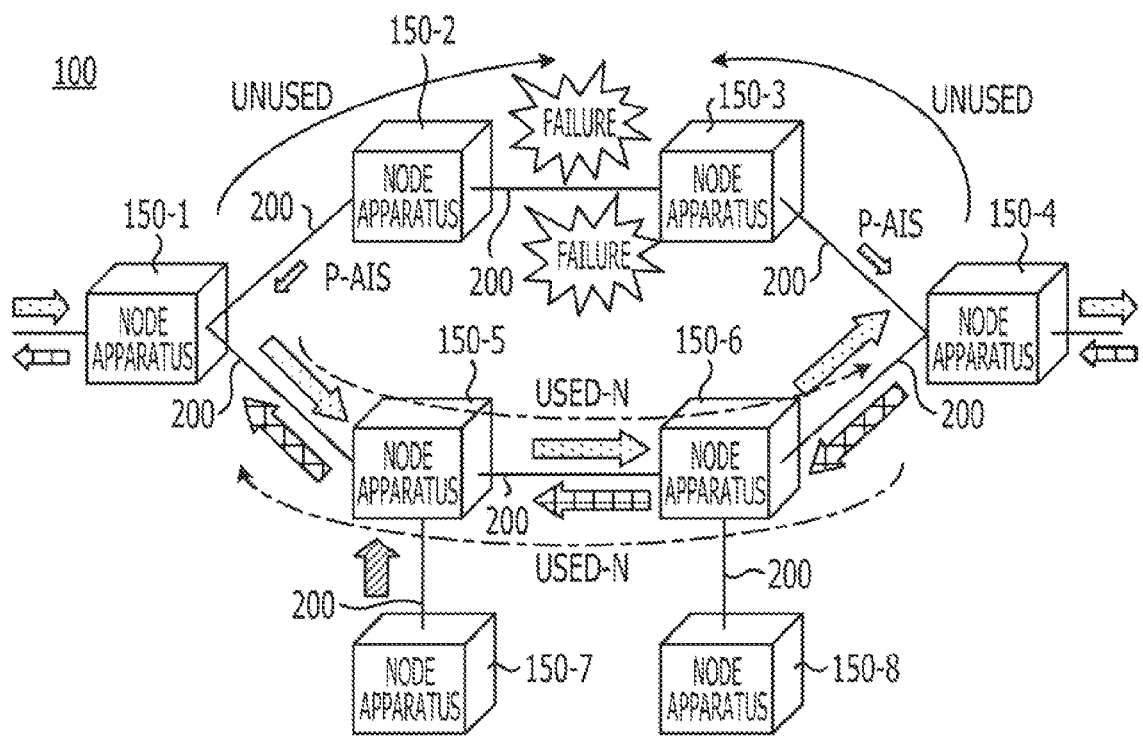
FIG. 21 illustrates a configuration of a communication network system working under failure conditions.
Figure 22:
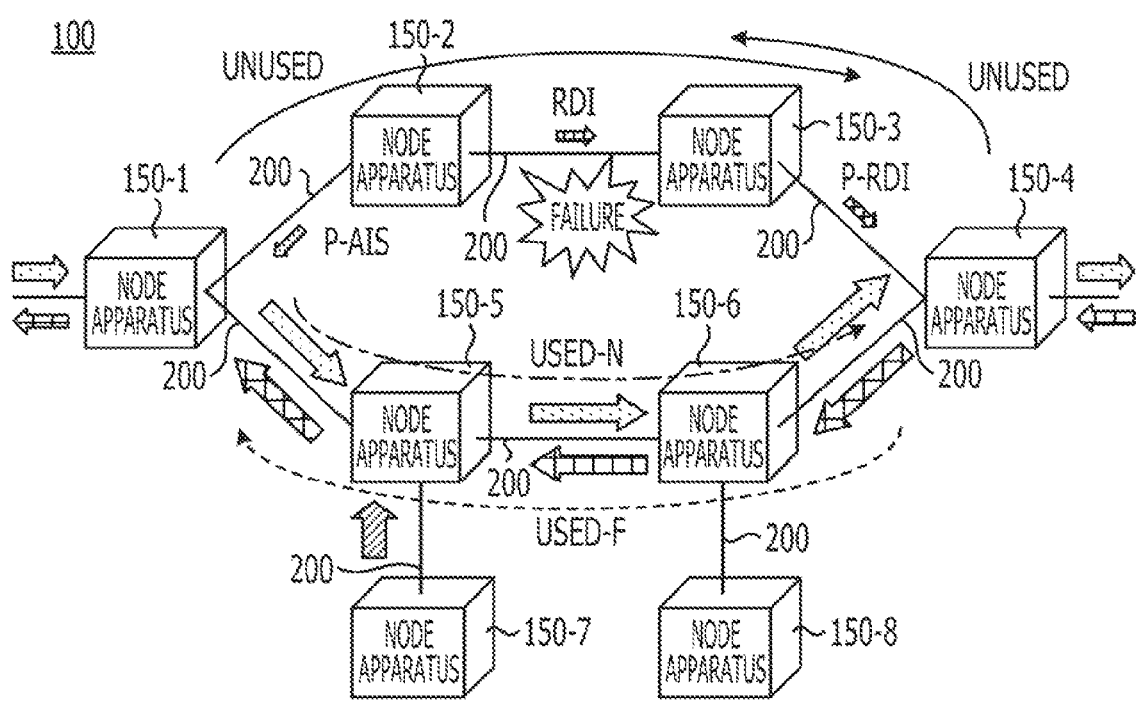
FIG. 22 illustrates a configuration of a recovered communication network system.
Figure 23:
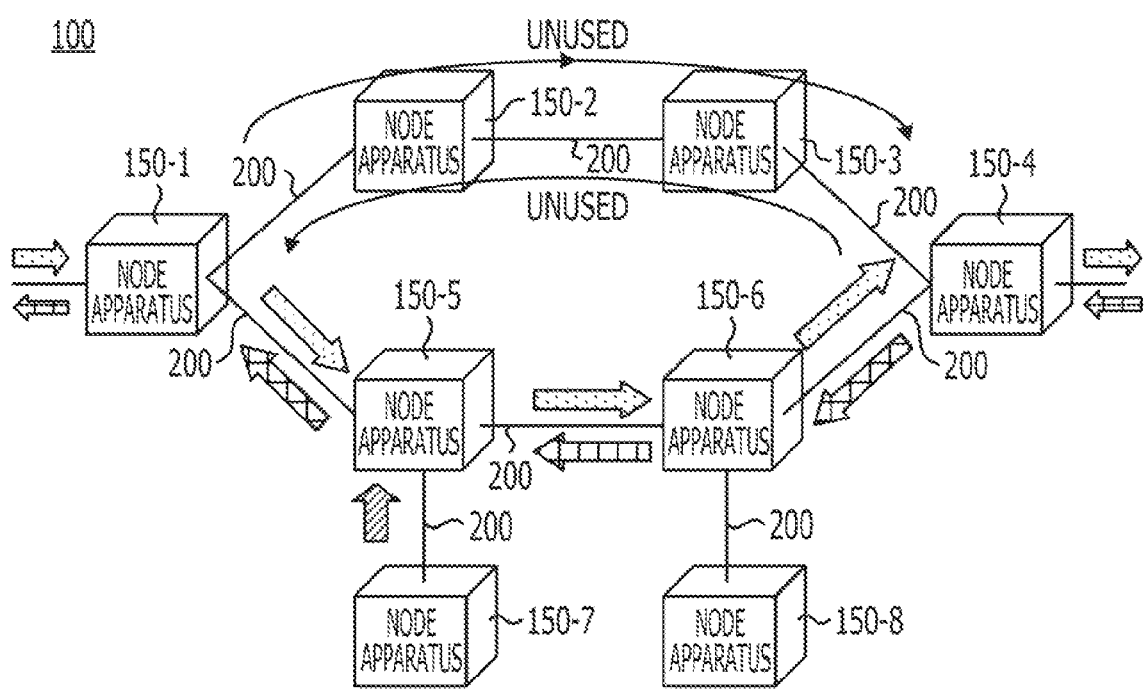
FIG. 23 illustrates a configuration of a recovered communication network system.

Next, an exemplary case where a failure occurs in a line provided on the data non-transmission side will be described with reference to FIGS. 20, 21, 22, and 23. Each of FIGS. 20 and 21 illustrates a configuration of a communication network system working under failure conditions. Each of FIGS. 22 and 23 illustrates a configuration of a recovered communication network system. FIG. 20 illustrates an exemplary state where a failure occurs in a line through which data is transmitted from the node apparatus 150-2 to the node apparatus 150-3, the state being attained in the state illustrated in FIG. 19. As illustrated in FIG. 20, the node apparatus 150-3 inserts RDI data into OAM packet data and transmits the OAM packet data to the node apparatus 150-2, and inserts P-AIS data into OAM packet data and transmits the OAM packet data to the node apparatus 150-4. Upon receiving the RDI data transmitted from the node apparatus 150-3, the node apparatus 150-2 inserts P-RDI data into OAM packet data and transmits the OAM packet data to the node apparatus 150-1 based on operations S207 and S208, which are mentioned above. The node apparatus 150-1 transmits USED-F data to the data transmission-side path while maintaining the data transmission direction based on operation S302, which is mentioned above. The node apparatus 150-4 transmits USED-N data to the data transmission-side path based on operation S502, which is mentioned above.

FIG. 21 illustrates an exemplary state where a failure occurs in a line through which data is transmitted from the node apparatus 150-3 to the node apparatus 150-2, the state being attained in the state illustrated in FIG. 20. As illustrated in FIG. 21, the node apparatus 150-2 inserts P-AIS data into OAM packet data and transmits the OAM packet data to the node apparatus 150-1. The node apparatus 150-1 transmits USED-N data through the data transmission-side path based on operation S502, which is mentioned above. Both the node apparatuses 150-1 and 150-4 do not change the data transmission direction based on operation S602, which is mentioned above to receive the USED-N data transmitted through the data transmission-side path.

FIG. 22 illustrates an exemplary state where a recovery from a failure is made, the failure occurring in a line through which data is transmitted from the node apparatus 150-2 to the node apparatus 150-3, the state being attained in the state illustrated in FIG. 21. The node apparatus 150-3 receives RDI data transmitted from the node apparatus 150-2. The node apparatus 150-3 inserts P-RDI data into OAM packet data and transmits the OAM packet data to the node apparatus 150-4 based on operation S208, which is mentioned above. The node apparatus 150-4 transmits USED-F data through the data transmission-side path based on operation S302, which is mentioned above.

FIG. 23 illustrates an exemplary state where a recovery from a failure is made, the failure occurring in a line through which data is transmitted from the node apparatus 150-3 to the node apparatus 150-2, the state being attained in the state illustrated in FIG. 22. Due to a recovery from a failure occurring in the line 200 through which data is transmitted from the node apparatus 150-3 to the node apparatus 150-2, the node apparatus 150-2 stops transmitting P-AIS data to the node apparatus 150-1 and transmitting RDI data to the node apparatus 150-3. Since no RDI data is transmitted from the node apparatus 150-2 to the node apparatus 150-3, the node apparatus 150-3 stops transmitting P-RDI data to the node apparatus 150-4. Since no P-RDI data is transmitted to the node apparatus 150-4, the node apparatus 150-4 stops transmitting USED-F data through the data transmission-side path based on operation S701. Further, since no P-AIS data is transmitted to the node apparatus 150-1, the node apparatus 150-1 stops transmitting USED-N data through the data transmission-side path based on operation S704, which is mentioned above.

Figure 24:
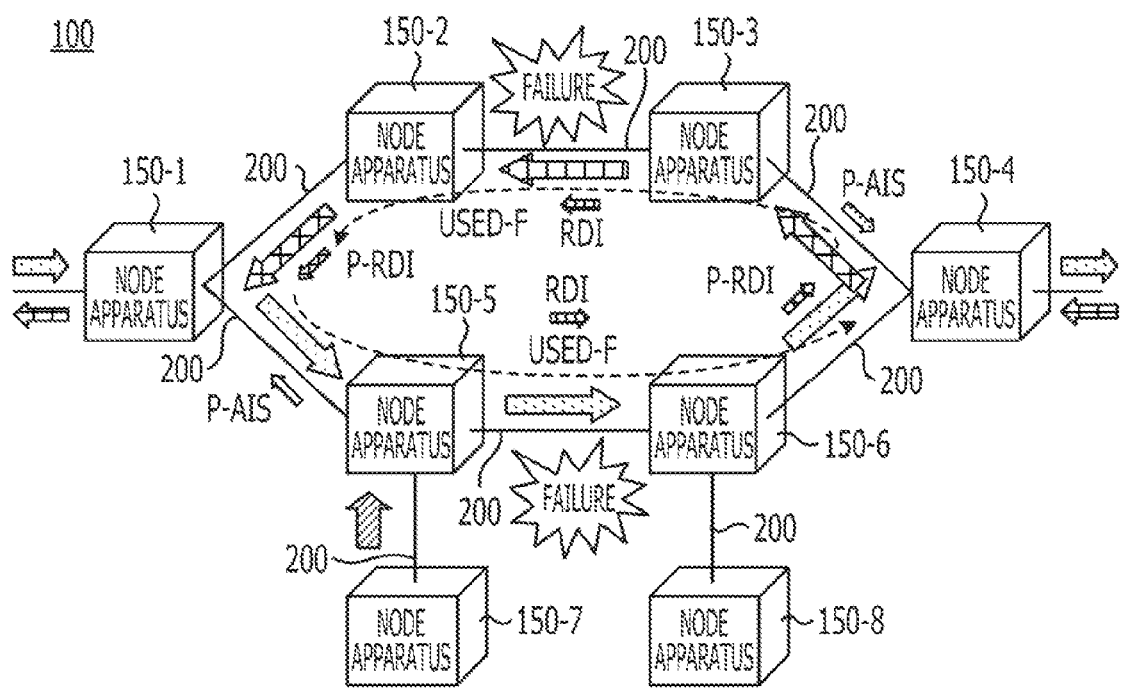
FIG. 24 illustrates a configuration of a communication network system working under failure conditions.
Figure 25:
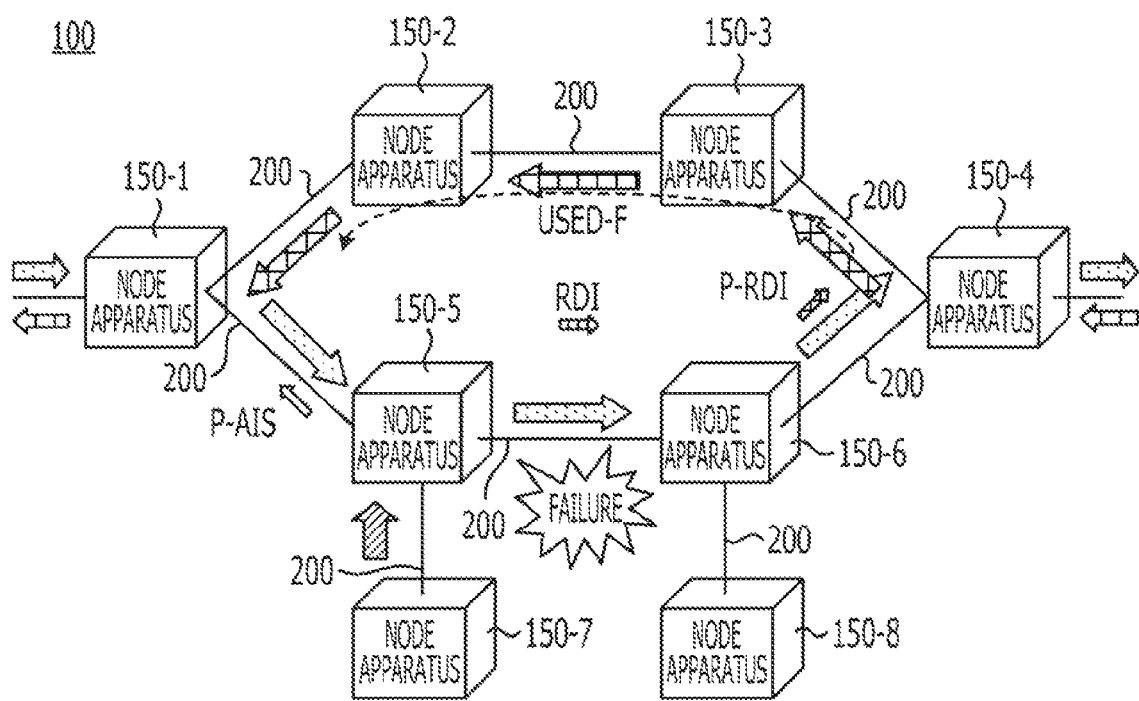
FIG. 25 illustrates a configuration of a recovered communication network system.
Figure 26:
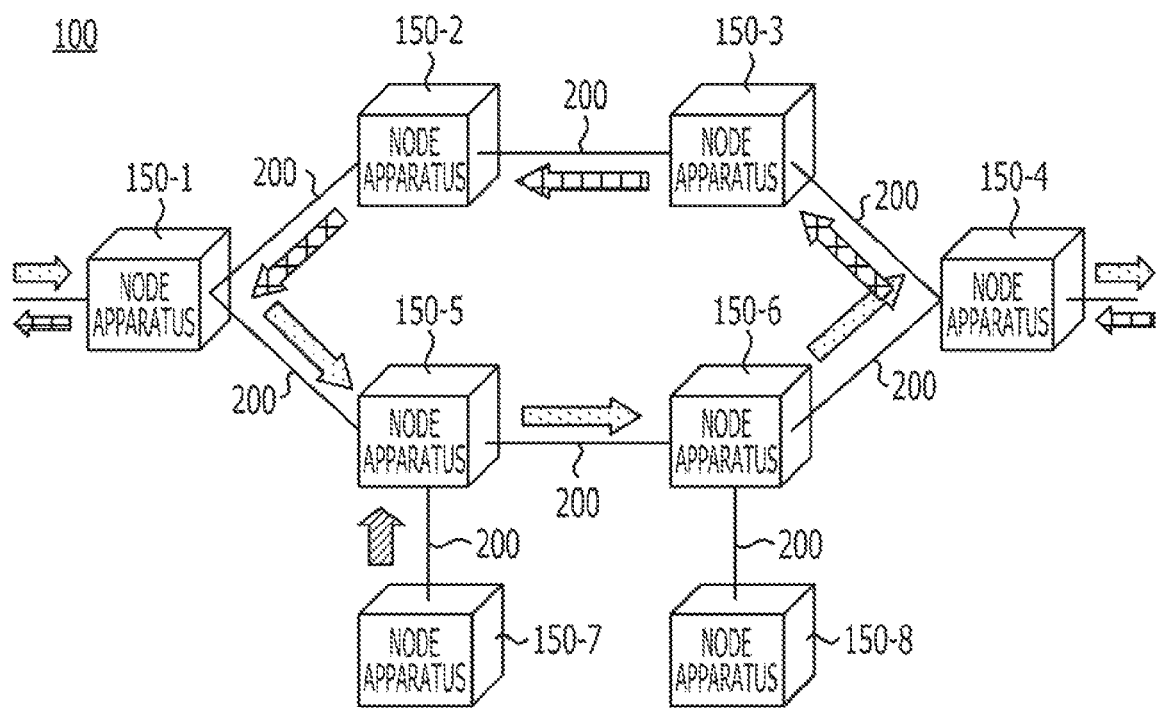
FIG. 26 illustrates a configuration of a recovered communication network system.

Next, an exemplary case where a failure occurs in each of a line provided on the data non-transmission side and that provided on the data transmission side will be described with reference to FIGS. 24, 25, and 26. FIG. 24 illustrates a configuration of a communication network system working under failure conditions. Each of FIGS. 25 and 26 illustrates a configuration of a recovered communication network system. FIG. 24 illustrates an exemplary state where a failure occurs in a line through which data is transmitted from the node apparatus 150-6 to the node apparatus 150-5, the state being attained in the state illustrated in FIG. 20. Upon detecting the failure occurrence, the node apparatus 150-5 inserts RDI data into OAM packet data and transmits the OAM packet data to the node apparatus 150-6, and inserts P-AIS data into OAM packet data and transmits the OAM packet data to the node apparatus 150-1 as illustrated in FIG. 24. Upon receiving the RDI data transmitted from the node apparatus 150-5, the node apparatus 150-6 inserts P-RDI data into OAM packet data and transmits the OAM packet data to the node apparatus 150-4 based on operations S207 and S208, which are mentioned above. The node apparatus 150-4 changes the data transmission path to the path extending via the node apparatuses 150-3 and 150-2 based on operation S303. Further, the node apparatus 150-4 transmits USED-F data to the path extending via the node apparatuses 150-3 and 150-2. Further, the node apparatus 150-4 transmits UNUSED data through the path extending via the node apparatuses 150-6 and 150-5.

FIG. 25 illustrates an exemplary state where a recovery from a failure is made, the failure occurring in a line through which data is transmitted from the node apparatus 150-2 to the node apparatus 150-3, the state being attained in the state illustrated in FIG. 24. Due to the recovery from a failure occurring in the line 200 through which data is transmitted from the node apparatus 150-2 to the node apparatus 150-3, the node apparatus 150-3 stops transmitting P-AIS data to the node apparatus 150-4 and transmitting RDI data to the node apparatus 150-2. Since no P-AIS data is transmitted to the node apparatus 150-4, the node apparatus 150-4 stops transmitting USED-F data to the data transmission-side path based on operation S704. Since no RDI data is transmitted from the node apparatus 150-3 to the node apparatus 150-2, the node apparatus 150-2 stops transmitting P-RDI data to the node apparatus 150-1. Since no P-RDI data is transmitted to the node apparatus 150-1, the node apparatus 150-1 stops transmitting USED-F data through the data transmission-side path based on operation S701.

FIG. 26 illustrates an exemplary state where a recovery from a failure is made, the failure occurring in a line through which data is transmitted from the node apparatus 150-6 to the node apparatus 150-5, the data being attained in the state illustrated in FIG. 25. Due to the recovery from a failure occurring in the line 200 through which data is transmitted from the node apparatus 150-6 to the node apparatus 150-5, the node apparatus 150-5 stops transmitting P-AIS data to the node apparatus 150-1 and transmitting RDI data to the node apparatus 150-6. Since no RDI data is transmitted from the node apparatus 150-5 to the node apparatus 150-6, the node apparatus 150-6 stops transmitting P-RDI data to the node apparatus 150-4.

Thus, according to the communication network system of the present embodiment, an end node apparatus functioning as the data source transmits data through only one of the paths of the two systems that are provided between its own node apparatus and an end node apparatus functioning as the data destination. According to the communication network system of the present embodiment, therefore, it becomes possible to transmit data used for a different service through the other path, which increases the utilization efficiency of the lines 200 of the MPLS network. Further, when a failure occurs in one of the paths in the communication network system of the present embodiment, the end node apparatus functioning as the data source changes the failure occurring path to the other path for data transmission. Therefore, even though a failure occurs in a line relating to one of the paths of the communication network system of the present embodiment, data may be transmitted to the end node apparatus functioning as the data destination.

Further, when a failure occurs in a line provided between intermediate node apparatuses of the communication network system of the present embodiment, the intermediate node apparatus provided at the location where the line failure occurs position transmits P-RDI data to an end node apparatus functioning as the data source via a different intermediate node apparatus. Accordingly, upon receiving the P-RDI data transmitted through a path used to transmit data, the end node apparatus functioning as the data source may detect that the failure occurs in a line relating to the data transmission-side path. Therefore, the data destination-end node apparatus may change the failure occurring path to the other path for data transmission. As a consequence, the data propagation route of the communication network system of the present embodiment becomes shorter than that attained when the intermediate node apparatus provided at the location where the line failure occurs sends back the transmitted data so that the sent-back data is transmitted to the end node apparatus functioning as the data destination.

Still further, when a failure occurs in a line provided between intermediate node apparatuses of the communication network system of the present embodiment, the intermediate node apparatus provided at the location where the line failure occurs transmits P-AIS data to an end node apparatus functioning as the data destination via a different intermediate node apparatus. Upon receiving the P-AIS data transmitted through a path which is not used to transmit data, the end node apparatus functioning as the data destination transmits USED-N data through a path used to transmit data. Accordingly, upon receiving the USED-N data transmitted through the path which is not used to transmit data, the end node apparatus functioning as the data source may detect that a failure occurs in a line relating to a path provided on the data transmission side. Therefore, the data source-end node apparatus may change the data transmission-side path to the other path. As a consequence, even though a failure occurs in a bidirectional line relating to a certain path of the communication network system of the present embodiment, an end node apparatus functioning as the data source may detect a failure occurring in a line relating to a path provided on the data transmission side and change the data transmission-side path to the other path.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments have been described in detail, it should be understood that the various changes, substitutions, and alterations could be made hereto without departing from the spirit and scope of the invention.

What is claimed is:

1. A communication network system comprising:
a processor;
a plurality of node apparatuses using a protocol to establish paths therebetween, and
a plurality of intermediate node apparatuses provided on the two paths and configured to pass on a packet data including a user data, where each of the intermediate node apparatuses stores a line/path database including data on an identifier of a path connected to a downstream-side line, through which the packet data is transmitted from the intermediate node apparatus to an adjacent intermediate apparatus provided on a downstream side,
wherein the processor transmits an UNUSED packet data indicating that the packet data is not transmitted to a path which is established but not currently used to transmit the user data,
wherein the processor determines each of the node apparatuses to be a packet source or a packet destination, and operates to detect an occurrence of failure in two paths being established between the packet source and the packet destination in the communication network system,
wherein the processor transmits packet data including user data through one of the two paths, and when one of the node apparatuses detects an occurrence of a failure in one of the two paths, the processor changes the path to the other path,
wherein the processor detects an occurrence of a failure in an upstream-side line, through which the packet data is transmitted from an adjacent intermediate node apparatus to the intermediate node apparatus,
wherein when the failure in the upstream-side line is detected, remote defect indication (RDI) packet data indicating an alarm is transmitted to the upstream-side adjacent intermediate node apparatus, and, upon receiving the RDI data transmitted from the downstream-side adjacent intermediate node apparatus, path-RDI (P-RDI) packet data indicating an alarm to each path, is transmitted to the path connected to the downstream-side line by referring to the line/path database,
wherein when the processor receives the P-RDI data indicating the occurrence of the failure in the path, the processor changes the path to a different path,
wherein, upon detecting the failure in the upstream-side line, the processor transmits path alarm indication signal (P-AIS) packet data indicating an alarm to each path to a node apparatus functioning as a destination of the packet data including the user data via the downstream-side intermediate node apparatus,
wherein, upon receiving the P-AIS data transmitted through the path on which the UNUSED packet data is transmitted, the processor transmits to the path to be used a USED-N packet data that indicates reception of the P-AIS data transmitted through the path on which the UNUSED packet data is transmitted, and
wherein, upon detecting the occurrence of the failure in the path by receiving the USED-N packet data through the path on which the UNUSED packet data is transmitted, the processor changes the path to a different path.

2. A data transmission method comprising:
transmitting an UNUSED packet data indicating that a packet data is not transmitted to a path which is established but not currently used to transmit a user data;
transmitting packet data including user data from a node apparatus functioning as a packet source to a node apparatus functioning as a packet destination through one of two paths established between a plurality of node apparatuses using a protocol to establish paths therebetween;
detecting an occurrence of a failure in an upstream-side line of the two paths through which the packet data is transmitted to an intermediate node apparatus from an adjacent intermediate node apparatus provided on an upstream side, the two paths including a plurality of intermediate node apparatuses that transmit packet data including the user data;
transmitting a remote defect indication (RDI) packet data indicating an alarm to the upstream-side adjacent intermediate node apparatus when the failure in the upstream-side line is detected; and
transmitting a path-RDI (P-RDI)data upon receiving the RDI data transmitted from an adjacent intermediate node apparatus provided on a downstream side, the P-RDI data being packet data indicating an alarm issued to each path connected to a downstream-side line by referring to a line/path database including data on an identifier of the path connected to the downstream-side line,
wherein, when an occurrence of the failure in the path is detected by receiving the P-RDI data, the path is changed to a different path,
wherein, when an occurrence of the failure in the upstream-side line through the failure detection is detected, a path alarm indication signal (P-AIS) packet data indicating an alarm issued to each path is transmitted to a node apparatus functioning as a destination via the downstream-side adjacent intermediate node apparatus,
wherein, when the P-AIS data transmitted through the path on which the UNUSED packet data is transmitted is received, a USED-N packet data that indicates reception of the P-AIS data transmitted through the path on which the UNUSED packet data is transmitted is transmitted to the path to be used, and
wherein, when an occurrence of the failure in the path is detected by receiving the USED-N packet data through the path on which the UNUSED packet data is transmitted, the path is changed to a different path.

3. A node apparatus using a protocol to establish paths between a node apparatus functioning as a packet source and a node apparatus functioning as a packet destination, the node apparatus comprising:
a processor configured to transmit a UNUSED packet data indicating that a packet data including a user data is not transmitted to a path which is established but not currently to be used to transmit the user data, and detect an occurrence of a failure in two paths established between the node apparatus and the node apparatus being the packet destination, wherein the processor transmits the packet to one of the paths, and changes the path to the other path when an occurrence of a failure in the path is detected, wherein the processor detects an occurrence of a failure in the path by receiving a path remote detect indication (P-RDI) packet data indicating an alarm issued to each path from other node apparatuses in response to detection of the occurrence of the failure in the path connecting the other node apparatuses included in the two paths, wherein, upon detecting the occurrence of the failure in the path by receiving the P-RDI data transmitted through a path used to transmit the packet data including the user data, the path is changed to a different path, wherein the processor detects an occurrence of a failure in the path by receiving a USED-N packet data transmitted from the node apparatus functioning as a destination apparatus, the USED-N packet data is sent based on the a path alarm indication signal (P-AIS) data indicating an alarm issued to each path, the P-AIS data being transmitted through the path on which the UNUSED packet data is transmitted in response to detection of the occurrence of the failure in the path connecting the other node apparatuses, and wherein, upon detecting the occurrence of the failure in the path by receiving the USED-N packet data transmitted through a path which is not used to transmit the packet data including the user data, the path is changed to a different path.

* * * * *